US011943093B1

(12) United States Patent
Brooker et al.

(10) Patent No.: US 11,943,093 B1
(45) Date of Patent: Mar. 26, 2024

(54) NETWORK CONNECTION RECOVERY AFTER VIRTUAL MACHINE TRANSITION IN AN ON-DEMAND NETWORK CODE EXECUTION SYSTEM

(71) Applicant: Amazon Technologies, Inc., Seattle, WA (US)

(72) Inventors: Marc John Brooker, Seattle, WA (US); Timothy Allen Wagner, Seattle, WA (US); Mikhail Danilov, Sammamish, WA (US); Niall Mullen, Seattle, WA (US); Holly Mesrobian, Bellevue, WA (US); Philip Daniel Piwonka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 16/196,935

(22) Filed: Nov. 20, 2018

(51) Int. Cl.
*H04L 41/0654* (2022.01)
*G06F 9/455* (2018.01)
*H04L 69/16* (2022.01)

(52) U.S. Cl.
CPC ...... *H04L 41/0654* (2013.01); *G06F 9/45558* (2013.01); *H04L 69/16* (2013.01);
(Continued)

(58) Field of Classification Search
CPC . H04L 41/0654; H04L 69/16; G06F 9/45558; G06F 2009/4557; G06F 2009/45595
See application file for complete search history.

(56) References Cited

U.S. PATENT DOCUMENTS 4,949,254 A    8/1990   Shorter
5,283,888 A    2/1994   Dao et al.
(Continued)

FOREIGN PATENT DOCUMENTS

CA    2962633 C    4/2012
CA    2975522 A1    8/2016
(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
(Continued)

*Primary Examiner* — John A Follansbee
*Assistant Examiner* — Raqiul A Choudhury
(74) *Attorney, Agent, or Firm* — Knobbe, Martens, Olson & Bear, LLP

(57) ABSTRACT

Systems and methods are described for enabling graceful recovery of network connections in a virtual machine instance that has been migrated or temporarily halted. To prevent the virtual machine instance from attempting to reuse open connections, which might fail due to migration or halting, a host device identifies open connections just prior to halting the virtual machine instance on the host, and transmits to the virtual machine instance termination signals for the open connections. The host device may further transmit termination signals to the other parties to such connections. Each termination signal may be formatted so as to appear to originate from the other party to the connection, causing both parties to synchronize their knowledge of the connection. On reactivation, the virtual machine instance can recovery the connections without errors associated with attempted utilization of broken connections.

20 Claims, 8 Drawing Sheets

(52) U.S. Cl.
CPC .............. G06F 2009/4557 (2013.01); G06F 2009/45595 (2013.01)

(56) References Cited

U.S. PATENT DOCUMENTS

| | | | |
|---|---|---|---|
| 5,835,764 A | 11/1998 | Platt et al. | |
| 5,970,488 A | 10/1999 | Crowe et al. | |
| 5,983,197 A | 11/1999 | Enta | |
| 6,237,005 B1 | 5/2001 | Griffin | |
| 6,260,058 B1 | 7/2001 | Hoenninger et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |
| 6,523,035 B1 | 2/2003 | Fleming et al. | |
| 6,549,936 B1 | 4/2003 | Hirabayashi | |
| 6,708,276 B1 | 3/2004 | Yarsa et al. | |
| 7,036,121 B1 | 4/2006 | Casabona et al. | |
| 7,308,463 B2 | 12/2007 | Taulbee et al. | |
| 7,340,522 B1 | 3/2008 | Basu et al. | |
| 7,360,215 B2 | 4/2008 | Kraiss et al. | |
| 7,558,719 B1 | 7/2009 | Donlin | |
| 7,577,722 B1 | 8/2009 | Khandekar et al. | |
| 7,590,806 B2 | 9/2009 | Harris et al. | |
| 7,640,574 B1 | 12/2009 | Kim et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,831,464 B1 | 11/2010 | Nichols et al. | |
| 7,870,153 B2 | 1/2011 | Croft et al. | |
| 7,886,021 B2 | 2/2011 | Scheifler et al. | |
| 7,949,677 B2 | 5/2011 | Croft et al. | |
| 7,954,150 B2 | 5/2011 | Croft et al. | |
| 8,010,679 B2 | 8/2011 | Low et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 | 11/2011 | DeVal et al. | |
| 8,065,676 B1 | 11/2011 | Sahai et al. | |
| 8,065,682 B2 | 11/2011 | Baryshnikov et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,201,026 B1 | 6/2012 | Bornstein et al. | |
| 8,209,695 B1 | 6/2012 | Pruyne et al. | |
| 8,219,987 B1 | 7/2012 | Vlaovic et al. | |
| 8,296,267 B2 | 10/2012 | Cahill et al. | |
| 8,321,554 B2 | 11/2012 | Dickinson | |
| 8,321,558 B1 | 11/2012 | Sirota et al. | |
| 8,336,079 B2 | 12/2012 | Budko et al. | |
| 8,352,608 B1 | 1/2013 | Keagy et al. | |
| 8,387,075 B1 | 2/2013 | McCann et al. | |
| 8,392,558 B1 | 3/2013 | Ahuja et al. | |
| 8,402,514 B1 | 3/2013 | Thompson et al. | |
| 8,417,723 B1 | 4/2013 | Lissack et al. | |
| 8,429,282 B1 | 4/2013 | Ahuja | |
| 8,448,165 B1 | 5/2013 | Conover | |
| 8,479,195 B2 | 7/2013 | Adams et al. | |
| 8,490,088 B2 | 7/2013 | Tang | |
| 8,555,281 B1 | 10/2013 | Van Dijk et al. | |
| 8,560,699 B1 | 10/2013 | Theimer et al. | |
| 8,566,835 B2 | 10/2013 | Wang et al. | |
| 8,601,323 B2 | 12/2013 | Tsantilis | |
| 8,613,070 B1 | 12/2013 | Borzycki et al. | |
| 8,615,589 B1 | 12/2013 | Adogla et al. | |
| 8,631,130 B2 | 1/2014 | Jackson | |
| 8,667,471 B2 | 3/2014 | Wintergerst et al. | |
| 8,677,359 B1 | 3/2014 | Cavage et al. | |
| 8,694,996 B2 | 4/2014 | Cawlfield et al. | |
| 8,700,768 B2 | 4/2014 | Benari | |
| 8,713,093 B1 | 4/2014 | Upadhyay et al. | |
| 8,719,415 B1 | 5/2014 | Sirota et al. | |
| 8,725,702 B1 | 5/2014 | Raman et al. | |
| 8,756,322 B1 | 6/2014 | Lynch | |
| 8,756,696 B1 | 6/2014 | Miller | |
| 8,763,091 B1 | 6/2014 | Singh et al. | |
| 8,769,519 B2 | 7/2014 | Leitman et al. | |
| 8,793,676 B2 | 7/2014 | Quinn et al. | |
| 8,799,236 B1 | 8/2014 | Azari et al. | |
| 8,799,879 B2 | 8/2014 | Wright et al. | |
| 8,806,266 B1 | 8/2014 | Qu et al. | |
| 8,806,468 B2 | 8/2014 | Meijer et al. | |
| 8,806,644 B1 | 8/2014 | McCorkendale et al. | |
| 8,819,679 B2 | 8/2014 | Agarwal et al. | |
| 8,825,863 B2 | 9/2014 | Hansson et al. | |
| 8,825,964 B1 | 9/2014 | Sopka et al. | |
| 8,839,035 B1 | 9/2014 | Dimitrovich et al. | |
| 8,850,432 B2 | 9/2014 | Mcgrath et al. | |
| 8,869,300 B2 | 10/2014 | Singh et al. | |
| 8,874,952 B2 | 10/2014 | Tameshige et al. | |
| 8,904,008 B2 | 12/2014 | Calder et al. | |
| 8,949,457 B1 | 2/2015 | Theroux et al. | |
| 8,966,495 B2 | 2/2015 | Kulkarni | |
| 8,972,980 B2 | 3/2015 | Banga et al. | |
| 8,990,807 B2 | 3/2015 | Wu et al. | |
| 8,997,093 B2 | 3/2015 | Dimitrov | |
| 9,002,871 B2 | 4/2015 | Bulkowski et al. | |
| 9,021,501 B2 | 4/2015 | Li et al. | |
| 9,026,658 B2 | 5/2015 | Xu et al. | |
| 9,027,087 B2 | 5/2015 | Ishaya et al. | |
| 9,038,068 B2 | 5/2015 | Engle et al. | |
| 9,052,935 B1 | 6/2015 | Rajaa | |
| 9,086,897 B2 | 7/2015 | Oh et al. | |
| 9,086,924 B2 | 7/2015 | Barsness et al. | |
| 9,092,837 B2 | 7/2015 | Bala et al. | |
| 9,098,528 B2 | 8/2015 | Wang | |
| 9,104,477 B2 | 8/2015 | Kodialam et al. | |
| 9,110,732 B1 | 8/2015 | Forschmiedt et al. | |
| 9,110,770 B1 | 8/2015 | Raju et al. | |
| 9,111,037 B1 | 8/2015 | Nalis et al. | |
| 9,112,813 B2 | 8/2015 | Jackson | |
| 9,116,733 B2 | 8/2015 | Banga et al. | |
| 9,130,900 B2 | 9/2015 | Tran | |
| 9,141,410 B2 | 9/2015 | Leafe et al. | |
| 9,146,764 B1 | 9/2015 | Wagner | |
| 9,152,406 B2 | 10/2015 | De et al. | |
| 9,154,955 B1 | 10/2015 | Bertz et al. | |
| 9,164,754 B1 | 10/2015 | Pohlack | |
| 9,176,871 B1 | 11/2015 | Serlet | |
| 9,183,019 B2 | 11/2015 | Kruglick | |
| 9,189,778 B1 | 11/2015 | Sh. Al-Rashidi | |
| 9,195,520 B2 | 11/2015 | Turk | |
| 9,208,007 B2 | 12/2015 | Harper et al. | |
| 9,218,190 B2 | 12/2015 | Anand et al. | |
| 9,223,561 B2 | 12/2015 | Orveillon et al. | |
| 9,223,966 B1 | 12/2015 | Satish et al. | |
| 9,250,893 B2 | 2/2016 | Blahaerath et al. | |
| 9,268,586 B2 | 2/2016 | Voccio et al. | |
| 9,298,633 B1 | 3/2016 | Zhao et al. | |
| 9,317,689 B2 | 4/2016 | Aissi | |
| 9,323,556 B2 | 4/2016 | Wagner | |
| 9,361,145 B1 | 6/2016 | Wilson et al. | |
| 9,405,582 B2 | 8/2016 | Fuller et al. | |
| 9,411,645 B1 | 8/2016 | Duan et al. | |
| 9,413,626 B2 | 8/2016 | Reque et al. | |
| 9,417,918 B2 | 8/2016 | Chin et al. | |
| 9,430,290 B1 | 8/2016 | Gupta et al. | |
| 9,436,555 B2 | 9/2016 | Dornemann et al. | |
| 9,461,996 B2 | 10/2016 | Hayton et al. | |
| 9,471,775 B1 | 10/2016 | Wagner et al. | |
| 9,471,776 B2 | 10/2016 | Gu et al. | |
| 9,483,335 B1 | 11/2016 | Wagner et al. | |
| 9,489,227 B2 | 11/2016 | Oh et al. | |
| 9,497,136 B1 | 11/2016 | Ramarao et al. | |
| 9,501,345 B1 | 11/2016 | Lietz et al. | |
| 9,514,037 B1 | 12/2016 | Dow et al. | |
| 9,537,788 B2 | 1/2017 | Reque et al. | |
| 9,563,613 B1 | 2/2017 | Dinkel et al. | |
| 9,565,190 B1 | 2/2017 | Telvik et al. | |
| 9,575,798 B2 | 2/2017 | Terayama et al. | |

(56) References Cited

U.S. PATENT DOCUMENTS

| | | |
|---|---|---|
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 * | 9/2017 | Tarasuk-Levin .... G06F 11/1446 |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,817,346 B1 | 10/2020 | Culp et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,095,706 B1 | 8/2021 | Ankam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |

(56) References Cited

U.S. PATENT DOCUMENTS

| | | |
|---|---|---|
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |
| 11,836,516 B2 | 12/2023 | Brooker et al. |
| 11,861,386 B1 | 1/2024 | Varun Mukesh et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1* | 12/2006 | Hoshino ............ H04L 29/06027 709/238 |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |

(56) References Cited

U.S. PATENT DOCUMENTS

| | | |
|---|---|---|
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1* | 6/2013 | Takeshima .......... H04L 63/0281 709/203 |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |

(56) References Cited

U.S. PATENT DOCUMENTS

| | | |
|---|---|---|
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1* | 12/2014 | Raju .................... H04L 61/256 709/221 |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |

(56) References Cited

U.S. PATENT DOCUMENTS

| | | |
|---|---|---|
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092250 A1* | 3/2016 | Wagner ............... G06F 9/45558 718/1 |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1* | 7/2016 | Hoch ............... G06F 16/951 707/827 |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1* | 12/2016 | Brouwer ............... G06F 9/4856 718/1 |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177391 A1* | 6/2017 | Wagner ............... G06F 9/45533 |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1* | 8/2017 | Sreeramoju ......... H04L 43/0811 |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0255137 A1 | 9/2018 | Hu et al. |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0309819 A1 | 10/2018 | Thompson |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0068622 A1 | 2/2019 | Lin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102231 A1 | 4/2019 | Wagner |
| 2019/0102278 A1 | 4/2019 | Gahlin et al. |
| 2019/0108058 A1 | 4/2019 | Wagner et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0155629 A1 | 5/2019 | Wagner et al. |
| 2019/0171423 A1 | 6/2019 | Mishra et al. |
| 2019/0171470 A1 | 6/2019 | Wagner |

(56) References Cited

U.S. PATENT DOCUMENTS

| | | |
|---|---|---|
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0238590 A1 | 8/2019 | Talukdar et al. |
| 2019/0250937 A1* | 8/2019 | Thomas .............. G06F 9/45558 |
| 2019/0268152 A1 | 8/2019 | Sandoval et al. |
| 2019/0278938 A1 | 9/2019 | Greene et al. |
| 2019/0286475 A1* | 9/2019 | Mani .................... G06F 9/4856 |
| 2019/0286492 A1 | 9/2019 | Gulsvig Wood et al. |
| 2019/0303117 A1 | 10/2019 | Kocberber et al. |
| 2019/0306692 A1 | 10/2019 | Garty et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2019/0384647 A1 | 12/2019 | Reque et al. |
| 2019/0391834 A1 | 12/2019 | Mullen et al. |
| 2019/0391841 A1 | 12/2019 | Mullen et al. |
| 2020/0007456 A1 | 1/2020 | Greenstein et al. |
| 2020/0026527 A1 | 1/2020 | Xue et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0142724 A1 | 5/2020 | Wagner et al. |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0186445 A1 | 6/2020 | Govindaraju et al. |
| 2020/0192646 A1 | 6/2020 | Yerramreddy et al. |
| 2020/0192707 A1 | 6/2020 | Brooker et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0341741 A1 | 10/2020 | Brooker et al. |
| 2020/0341799 A1 | 10/2020 | Wagner et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2020/0412538 A1 | 12/2020 | Rosado |
| 2021/0019056 A1 | 1/2021 | Mangione-Tran |
| 2021/0042160 A1 | 2/2021 | Alamouti et al. |
| 2021/0081233 A1 | 3/2021 | Mullen et al. |
| 2021/0117217 A1 | 4/2021 | Croteau et al. |
| 2021/0117534 A1 | 4/2021 | Maximov et al. |
| 2021/0124822 A1 | 4/2021 | Tiwary et al. |
| 2021/0176333 A1 | 6/2021 | Coleman et al. |
| 2021/0232415 A1 | 7/2021 | Wagner et al. |
| 2021/0233045 A1 | 7/2021 | Singh et al. |
| 2021/0294646 A1 | 9/2021 | Hassaan et al. |
| 2021/0303720 A1 | 9/2021 | Creenaune et al. |
| 2021/0314250 A1 | 10/2021 | Laplante et al. |
| 2021/0342145 A1 | 11/2021 | Miller et al. |
| 2021/0342329 A1 | 11/2021 | Padmanabhan |
| 2021/0389963 A1 | 12/2021 | Wagner |
| 2022/0004423 A1 | 1/2022 | Brooker et al. |
| 2022/0012083 A1 | 1/2022 | Brooker et al. |
| 2022/0200993 A1 | 6/2022 | Smith |
| 2022/0201041 A1 | 6/2022 | Keiser, Jr. et al. |
| 2022/0214863 A1 | 7/2022 | Clement et al. |
| 2022/0391238 A1 | 12/2022 | Wagner |
| 2023/0024699 A1 | 1/2023 | Bayoumi et al. |
| 2023/0188516 A1 | 6/2023 | Danilov |

FOREIGN PATENT DOCUMENTS

| | | |
|---|---|---|
| CN | 1341238 A | 3/2002 |
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107533472 A | 1/2018 |
| CN | 107534672 A | 1/2018 |
| CN | 108885568 A | 11/2018 |
| CN | 109478134 A | 3/2019 |
| CN | 109564525 A | 4/2019 |
| CN | 112513813 A | 3/2021 |
| CN | 109564525 B | 5/2023 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| KR | 10-357850 B1 | 10/2002 |
| KR | 10-2021-0019533 A | 2/2021 |
| KR | 10-2541295 B1 | 6/2023 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |

(56) References Cited

FOREIGN PATENT DOCUMENTS

| | | | |
|---|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/039514 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/069104 A1 | 4/2020 |
| WO | WO 2020/264431 A1 | 12/2020 |
| WO | WO 2021/108435 A1 | 6/2021 |
| WO | WO 2023/107649 A1 | 6/2023 |

OTHER PUBLICATIONS

Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : http://docs.aws.amazon.com/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
CodeChef ADMIN discussion web page, retrieved from https://discuss.codechef.com/t/what-are-the-memory-limit-and-stack-size-on-codechef/14159, 2019.
CodeChef IDE web page, Code, Compile & Run, retrieved from https://www.codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., IO performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, 2009, 4 pages.
Tan et al., Provisioning for large scale cloud computing services, Jun. 2012, 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en .wikipedia.org/wiki/Application_programming_interface.
Wikipedia List_of_HTTP status_codes web page, retrieved from https://en.wikipedia.org/wiki/List_of_HTTP status_codes, 2019.
Wikipedia Recursion web page from date Mar. 26, 2015, retrieved using the WayBackMachine, from https://web.archive.org/web/20150326230100/https://en.wikipedia.org/wiki/Recursion_ (computer _science), 2015.
Wikipedia subroutine web page, retrieved from https://en.wikipedia.org/wiki/Subroutine, 2019.
Wu et al., HC-Midware: A Middleware to Enable High Performance Communication SystemSimulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yue et al., AC 2012-4107: Using Amazon EC2 in Computer and Network Security Lab Exercises: Design, Results, and Analysis, 2012, American Society for Engineering Education 2012.

(56) References Cited

OTHER PUBLICATIONS

Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071 dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Ha et al., A Concurrent Trace-based Just-In-Time Compiler for Single-threaded JavaScript, utexas.edu (Year: 2009).
Tange, "GNU Parallel: The Command-Line Power Tool", vol. 36, No. 1, Jan. 1, 1942, pp. 42-47.
Extended Search Report in European Application No. 19199402.9 dated Mar. 6, 2020.
Bebenita et al., "Trace-Based Compilation in Execution Environments without Interpreters," ACM, Copyright 2010, 10 pages.
Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).
Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).
Wood, Timothy, et al. "Cloud Net: dynamic pooling of cloud resources by live WAN migration of virtual machines." ACM Sigplan Notices 46.7 (2011): 121-132. (Year: 2011).
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Office Action in Canadian Application No. 2,962,633 dated May 21, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Japanese Application No. 2017-516168 dated Mar. 26, 2018.
Office Action in Indian Application No. 201717019903 dated May 18, 2020.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
First Examination Report for Indian Application No. 201717034806 dated Jun. 25, 2020.
Office Action in European Application No. 16781265.0 dated Jul. 13, 2020.
International Search Report and Written Opinion dated Oct. 15, 2019 for International Application No. PCT/US2019/039246 in 16 pages.
International Search Report for Application No. PCT/US2019/038520 dated Aug. 14, 2019.
International Search Report for Application No. PCT/US2020/039996 dated Oct. 8, 2020.
Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.
Bryan Liston, "Ad Hoc Big Data Processing Made Simple with Serverless Map Reduce", Nov. 4, 2016, Amazon Web Services <https://aws.amazon.com/bl ogs/compute/ad-hoc-big-data-processi ng-made-si mple-with-serverless-mapred uce>.
Dean et al, "MapReduce: Simplified Data Processing on Large Clusters", ACM, 2008, pp. 107-113.
Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.
Ekanayake et al., "Twister: A Runtime for Iterative MapReduce", ACM, 2010, pp. 810-818.
Fan et al., Online Optimization of VM Deployment in IaaS Cloud, Dec. 17, 2012-Dec. 19, 2012, 6 pages.
Hammoud et al, "Locality-Aware Reduce Task Scheduling for MapReduce", IEEE, 2011, pp. 570-576.
Kim et al, "MRBench: A Benchmark for Map-Reduce Framework", IEEE, 2008, pp. 11-18.
Lin, "MR-Apriori: Association Rules Algorithm Based on MapReduce", IEEE, 2014, pp. 141-144.
Ryden et al., "Nebula: Distributed Edge Cloud for Data-Intensive Computing", IEEE, 2014, pp. 491-492.
Search Query Report from IP.com, performed Dec. 2, 2020.
Search Query Report from IP.com, performed May 27, 2021.
Yang, The Application of MapReduce in the Cloud Computing: IEEE, 2011, pp. 154-156.

(56) References Cited

OTHER PUBLICATIONS

Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
Office Action in Canadian Application No. 2,962,631 dated May 31, 2021.
Office Action in Indian Application No. 201717013356 dated Jan. 22, 2021.
Office Action in Indian Application No. 201717027369 dated May 21, 2020.
Office Action in Chinese Application No. 201680020768.2 dated May 14, 2021 in 23 pages.
Office Action in Chinese Application No. 201680020768.2 dated Sep. 24, 2021 in 20 pages.
Decision to refuse a European Patent Application in European Patent Application No. 16716797.2 dated Dec. 20, 2021 in 20 pages.
Office Action in Chinese Application No. 2016800562398 dated Jun. 18, 2021.
Office Action in Indian Application No. 201817013748 dated Nov. 20, 2020.
Office Action in Chinese Application No. 201680072794.X dated Jun. 22, 2021.
Office Action in European Application No. 16823419.3 dated Mar. 12, 2021.
Office Action in Chinese Application No. 201780022789.2 dated Apr. 28, 2021.
Office Action in European Application No. 17776325.7 dated Apr. 12, 2021.
Office Action in Chinese Application No. 2017800451968 dated May 26, 2021.
Office Action in Chinese Application No. 2017800451968 dated Dec. 3, 2021 in 20 pages.
Office Action in European Application No. 17740533.9 dated May 4, 2021.
Office Action in European Application No. 17743108.7 dated Dec. 22, 2020.
International Preliminary Report on Patentability dated Dec. 29, 2020 for International Application No. PCT/US2019/039246 in 8 pages.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Preliminary Report on Patentability for Application No. PCT/US2020/039996 dated Jan. 6, 2022.
International Search Report for Application No. PCT/US2020/062060 dated Mar. 5, 2021.
Office Action in Japanese Application No. 2020-572443 dated Feb. 28, 2022.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Abebe et al., "EC-Store: Bridging the Gap Between Storage and Latency in Distribute Erasure Coded Systems", IEEE 38th International Conference on Distributed Computing Systems, 2018, pp. 255-266.
Huang et al., "Erasure Coding in Windows Azure Storege", USENIX, 2012 in 12 pages.
Rashmi et al., "EC-Cache: Load-Balance, Low-Latency Cluster Caching with Online Erasure Coding", USENIX, 2016, pp. 401-417.
Communication Pursuant to Article 94(3) EPC in European Application No. 19199402.9 dated Apr. 19, 2022 in 8 pages.
European Examination Report, re EP Application No. 17743108.7, dated Oct. 12, 2022.
Office Action in European Application No. 16823419.3 dated May 20, 2022 in 6 pages.
Office Action in European Application No. 19740451.0 dated Jun. 13, 2022 in 4 pages.
Office Action in Japanese Application No. 2020-572443 dated Sep. 29, 2022.
Office Action in Korean Application No. 10-2021-7000975 dated Mar. 31, 2022 in 12 pages.
Office Action in European Application No. 19736909.3 dated Oct. 12, 2022.
Office Action in Japanese Application No. 2021-517335 dated May 16, 2022.
International Preliminary Report on Patentability for Application No. PCT/US2020/062060 dated Jun. 9, 2022 in 9 pages.
Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.
Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.
Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.
Anonymous: SaaS Tenant Isolation Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet: URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Al-Ali, et al., Making Serverless Computing More Serverless. 2018 IEEE 11th International Conference on Cloud Computing (CLOUD). Https://ieeexplore.ieee.org/stamp/stamp.jsp?tp=&amumber=8457832 (Year: 2018).

(56) References Cited

OTHER PUBLICATIONS

Gimenez-Alventosa, et al., tAsCAAs: a Multi-Tenant Serverless Task Scheduler and Load Balancer as a Service. IEEE Access, vol. 9. https://ieeexplore.ieee.org/stamp/stamp.jsp?tp=&amumber=9528423 (Year: 2021).

IBM, what is Serverless computing, https://www.ibm.com/topics/serverless#:-:test=Serverless%20is%20a%20cloud%20computing,managing%20servers%20or%20backend%20infrastructure, pp. 1-11 (Year: 2023).

Khedekar, et al., Multi-Tenant Big Data Analytics on AWS Cloud Platform. 2020 10th Annual Computing and Communication Workshop and Conference (CCWC). Https://ieeexplore.ieee.org/stamp/staum.jsp?tp=&amumber=9031133 (Year: 2020).

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).

Wikipedia: Serverless computing, https://en.wikipedia.org/wiki/Serverless_computing, pp. 107 (Year: 2023).

Zheng, et al., "A Multi-Tenant Framework for Cloud Container Services," 2021 IEEE 41st International Conference on Distributed Computer Systems (ICDCS). Https://ieeexplore.ieee.org/stamp/stamp.jsp?tp=&amumber=9546534 (Year: 2021).

\* cited by examiner

NETWORK CONNECTION RECOVERY AFTER VIRTUAL MACHINE TRANSITION IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
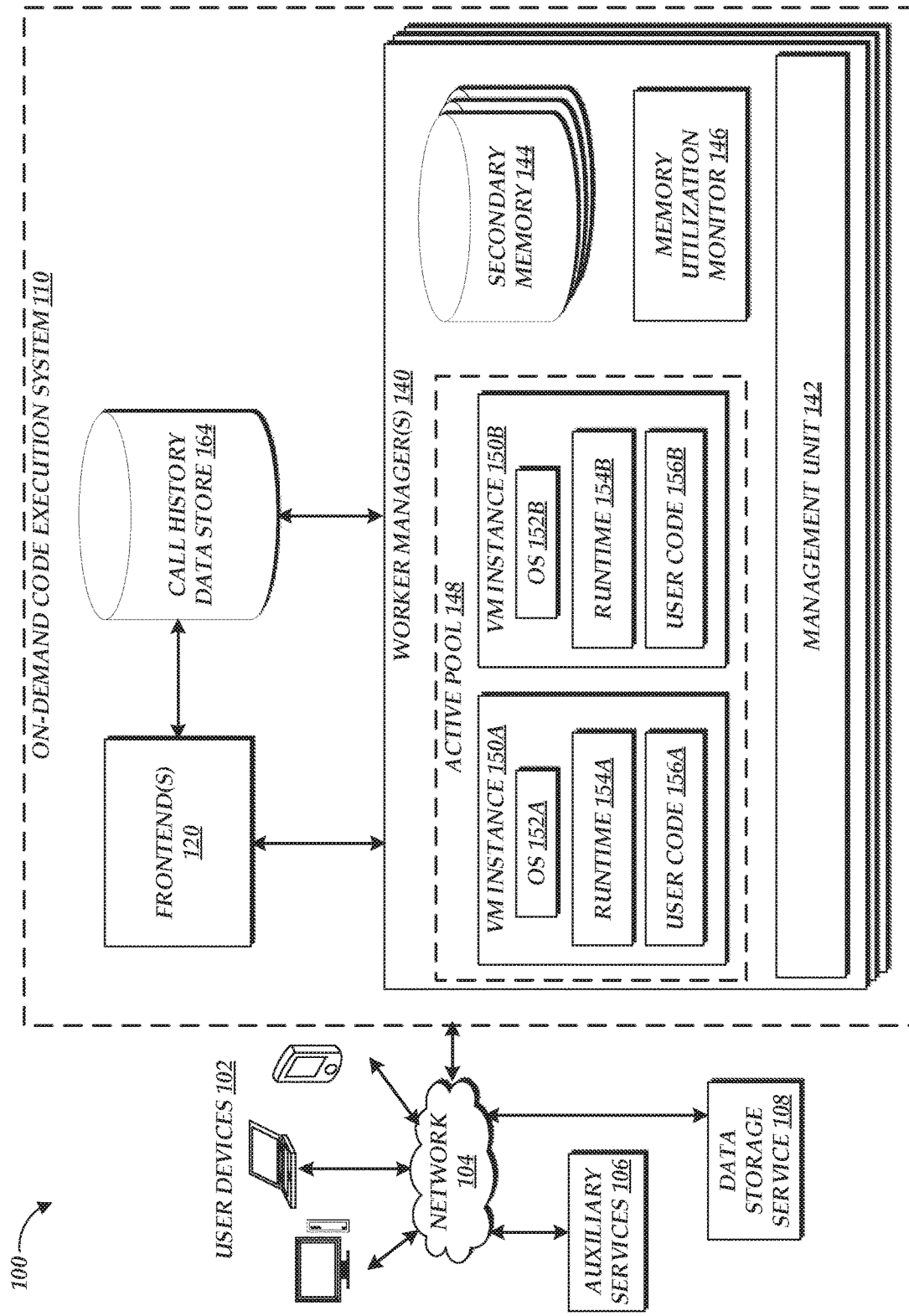
FIG. 1 is a block diagram depicting an illustrative environment in which an on-demand code execution system can operate to execute tasks corresponding to code, which may be submitted by users of the on-demand code execution system, and to transition execution environments into various memory states based on an expected timing of a next execution of such code.

Generally described, aspects of the present disclosure relate to an on-demand code execution system enabling rapid execution of code, which may be supplied by users of the on-demand code execution system. An on-demand code execution system may also be known as a "serverless" execution system or a request-drive code execution system. More specifically, embodiments of the present disclosure relate to facilitating recovery of stateful network connections of an execution environment on the on-demand code execution system when those connections are expected to be disrupted, such as by migration of the execution environment to another device or by a change in state of the execution environment (e.g., suspension or deactivation).

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may implement a variety of technologies to enable rapid execution of code. Illustratively, the on-demand code execution system may be configured to maintain a number of execution environments, such as virtual machine instances, software containers, or the like, in which code of a task may be provisioned and executed. In some instances, an appropriate execution environment may be currently executing on the on-demand code execution system on a host device nearby to an end user, and thus execution of a task may require little more than provisioning the execution environment with code and executing that code. In other instances, these execution environments may not be executing, and thus execution of a task may also require initializing the environment (e.g., by launching a virtual machine instance, which may include loading an operating system, etc.). In general, maintaining an environment in an executing state can facilitate more rapid execution of a task, but also utilizes some amount of working computing resources of a host computing device, such as central processing unit (CPU) cycles and registers, random access memory (RAM), and the like. In contrast, maintaining an environment in a non-executing state (e.g., a shut down virtual machine instance), can utilize fewer or no working resources, and can instead utilize non-working resources (e.g., resources not required for currently executing processes) such as long term memory storage provided by a hard disk drive (HDD). However, maintaining an environment in a non-executing state may require that the environment first be initialized prior to executing a task within the environment, thus potentially delaying execution of the task.

To address this trade-off, embodiments of the on-demand code execution system can be configured to modify a memory state of an execution environment according to a next predicted execution of the task, such that the overall computing resource usage of the on-demand code execution system is reduced, and/or such that the on-demand code execution system can facilitate more executions of tasks within a given set of computing resources. Specifically, embodiments of the present disclosure enable the on-demand code execution system to utilize historical information regarding executions of tasks to predict, for a given task, when a next request to execute that task will occur. The on-demand code execution system may then place an execution environment for the task into a memory state based on that predicted next execution request. For example, where the next execution request is expected to occur shortly, the on-demand code execution system may maintain an environment for the task in an executing state, such as within RAM or other primary memory of a host device. Conversely, when the next execution request is expected to occur at a significantly later time, the on-demand code execution system may maintain the environment for the task in a non-executing state within a secondary memory, such as a hard disk drive. Because secondary memory is generally more readily available within a host device than primary memory, and because maintaining an environment in a non-executing state generally minimizes or negates load on processing resources of a host (e.g., a CPU), maintaining an environment within secondary memory can reduce computing resource usage of a host device and free those resources for use in executing other tasks, thus improving the efficiency of the on-demand code execution system overall.

In some instances, a host device of the on-demand code execution system may have access to multiple levels of secondary memory, in addition to a primary memory (e.g., RAM). For example, a host device may have access to very rapid non-volatile memory, such as 3D XPOINT™ memory, developed by Intel Corporation (which memory implements a specific technology architecture generally classified as a type of resistive random-access memory, or "ReRAM"), relatively less rapid flash storage (e.g., within a solid state disk (SSD) drive), relatively less rapid magnetic storage memory (e.g., within an HDD), and still relatively less rapid non-local storage (e.g., a network-attached storage, or "NAS," which may be implemented by any of a variety of physical memory storage devices, including the preceding memory device types). In general, the speed of memory (e.g., in terms of bandwidth) can be expected to be inversely proportional to the amount of such memory available. Thus, 3D XPOINT memory is expected to be less available than flash storage, which is expected to be less available than magnetic storage, etc. As used herein, the term "lower tier" memory is generally intended (unless noted to the contrary) to refer to memory with lower speed but greater expected availability than a "higher tier" memory, which in turn is generally intended to refer to memory with higher speed and lower expected availability. As such, transitioning an execution environment to a lower tier of memory is generally expected to reduce the resource usage of the on-demand code execution system in maintaining that environment, while at the same time increasing the time required to initialize the environment such that a task may be executed within the environment. As will be discussed below, the on-demand code execution system can therefore be configured to transition an environment to a lowest tier memory possible while still maintaining the ability of the on-demand code execution system to rapidly execute a task within the environment based on a predicted next request to execute the task.

In one embodiment, a predicted next request to execute a task may be based on historical information regarding the task. Illustratively, if requests to execute a task have historically (e.g., over a past period of time, such as a day, week, month, year, etc.) occurred at a set frequency of once per minute, the on-demand code execution system may expect that a next request to execute the task will occur one minute after a prior request. This illustrative example may occur when an external system, such as a web service, has been configured to call to the on-demand code execution system for execution of a task at the set frequency. In some instances, the on-demand code execution system may be configured to calculate an expected range of time until a next request to execute a task based on historical information. For example, the on-demand code execution system may apply common statistical techniques to calculate a mean or median predicted time until a next execution, or a standard deviation of a distribution of times between requests to execute the code. As a further example, the on-demand code execution system may calculate an interquartile range of a historical distribution of times between calls to execute a task, and use this range (along with a known last call to execute the task) to predict when a next call to execute a task will occur. In other embodiments, the on-demand code execution system may utilize other inputs to predict a next expected request to execute a task. For example, where little or no history exists for a given task, the on-demand code execution system may instead utilize request histories of similar tasks to calculate the next expected request to execute the given task. Similar tasks may be identified, for example, based on length of source code for the task, functions called within the code, libraries utilized by the task, a type of environment (e.g., operating system or runtime environment) for the task, and the like. In some embodiments, the on-demand code execution system may have more specific knowledge of the next expected request to execute a task. For example, a creator of a task may explicitly ask that the on-demand code execution system execute the task at a set frequency, thus enabling the on-demand code execution system to determine with great accuracy when a next execution of the task will occur.

In one embodiment, the on-demand code execution system is configured, on detecting an idle execution environment for a task in a primary memory (e.g., after execution of the task within the environment), to transition the environment to a lowest tier memory which would still enable the environment to be transitioned back to an executing state prior to a time of a next expected request to execute the task. For example, where a next expected request to execute a task in an environment is one minute in the future, and transitioning an environment to a given tier of secondary memory and back into primary memory is expected to take 50 seconds of time (e.g., 25 seconds to halt execution and transition to secondary memory and the same amount of time to transition to primary memory and initialize the environment), the on-demand code execution system may be configured to conduct that transition, thus "freeing up" an amount of primary memory supporting execution of the environment for ten seconds of time. (The amount freed in practice would exceed this, as some amount of primary memory would be expected to become available even before transitioning of the environment out of primary memory completes, and some amount would be expected not to be utilized until transitioning of the environment back to primary memory completes.)

While the above example may reduce overall usage of the primary memory, this example may not be desirable for the on-demand code execution system overall, as transitioning execution environments to secondary memory may also incur costs in terms of resource usage. Illustratively, in the example above, transitioning an environment from primary memory to secondary memory over a period of 25 seconds may utilize both the secondary memory and bandwidth of a communication bus between the primary and secondary memory. These other resources (the secondary memory and communication bus) may also support other operations of the on-demand code execution system. Thus, while transitioning an environment to secondary memory may free up a portion of the primary memory for a ten second period, it may also incur costs in terms of use of the secondary memory and the communication bus.

To address concern, embodiments of the present disclosure may calculate an expected cost (e.g., in terms of usage of computing resources) associated with maintaining an execution environment in a primary memory, as well as expected costs for transitioning the environment to each potential secondary memory (e.g., in terms of both usage of the secondary memory and usage of resources, such as a communication bus, to move the environment to the secondary memory). Each cost may be based at least partly on a timing of a next expected request to execute a task within the environment. The on-demand code execution system may thereafter transition the environment to a memory tier with a lowest expected overall cost to the on-demand code execution system.

In one embodiment, the execution environments managed by the on-demand code execution system correspond to virtual machine instances. To transition such instances from an executing to non-executing state, the on-demand code execution system may utilize "snapshots" of such virtual machine instances. Snapshotting of virtual machines is a known technique, and thus will not be described in detail herein. However, in brief, snapshotting may generate a data file which stores a state of a virtual machine instance at a point in time, including state elements such as a content of CPU registers of the virtual machine instance, contents of RAM of the virtual machine instances, states of pages within RAM (e.g., as "dirty" or "clean"), and any other information required to return the virtual machine instances to its prior state at a later point in time. Thus, as will be described below, the on-demand code execution system may be configured to modify a memory state of a virtual machine instance from primary memory to secondary memory by snapshotting a current state of the instances, and placing that snapshot into secondary memory. The on-demand code execution system may further modify a memory state of a virtual machine instance from a secondary memory to primary memory by utilizing the snapshot to reinitialize the virtual machine image in an executing state.

In addition to transitioning a virtual machine instance between primary and secondary memory, embodiments of the present disclosure may further enable transitioning virtual machine instances between memories of different host computing devices. For example, an on-demand code execution system may be implemented by devices distributed across a number of geographic locations, such as multiple data centers, each of which includes a number of host devices. To facilitate rapid execution of code, the on-demand code execution system may be configured to attempt to execute a task requested by an end user within an environment on a host device nearby to the end user (e.g., geographically or in terms of network distance). Due to movement of users, changes in capacity, failure of machines, and the like, it may be desirable to move execution environments between host devices, such that when a request to execute a task is received from an end user, the execution environment is hosted on a host device nearby to an end user with sufficient capacity to execute the task. A number of techniques are known in the art to determine a host device to which an execution environment should be migrated, and these techniques will thus not be discussed in detail herein. After selecting a host device to which an execution environment should be migrated, embodiments described herein may be utilized to migrate the execution environment from a current host device to a destination host device. Illustratively, an execution environment may be migrated from an executing state on a first host device to a secondary memory of the second host device in accordance with embodiments of the present disclosure.

One potential issue raised by transitioning an execution environment into an inactive state, or transitioning an environment between host devices (e.g., migrating the environment) is a disruption of stateful network connections. Generally described, stateful network connections are communication sessions between two devices on a communication network, where each device maintains "state" information reflecting a state of the communication session. One example of a stateful network connection is a connection between two computing devices implementing the transport control protocol (TCP). In a TCP network connection, two devices maintain state information regarding a TCP session, and negotiate to establish the state of that session. The information maintained by each device generally includes a "5-tuple" (a set of five values that at least partly define the session) and a session number. The five values of the 5-tuple generally identify for the session a source internet protocol (IP) address and port number, a destination IP address and port number, and an identifier of TCP protocol. Each device further maintains a sequence number, identifying an ordering of communications in the session. If any of the information maintained at a device changes, the TCP connection can be broken. For example, if an execution environment establishes a TCP connection to an external device and is then migrated from one host device to another, the environment may obtain a new IP address based on its new location. This may alter the 5-tuple of the TCP session, resulting in the external device rejecting the TCP connection if the environment attempts to utilize it. Stateful connections can also be broken due to inactivity, such as a timeout occurring at either device. Thus, if an execution environment is rendered inactive for a sufficient period of time, an external device may consider a TCP connection with the environment to be closed. On reactivating the environment, the environment may not be aware of this change (since, from the point of view of the environment, the timeout might not have occurred), and may attempt to utilize the TCP connection, resulting in an error. While examples are provided herein with reference to TCP, similar issues may exist within any stateful or connection-oriented protocol, including protocols layered over otherwise stateless protocols (e.g., the User Datagram Protocol, or "UDP"). Thus, transitions in state or location of an execution environment can be detrimental to stateful network connections of the device.

Embodiments of the present disclosure address these problems by providing a mechanism for gracefully halting and recovering stateful network connections on an execution environment that is transitioned in state or location. Specifically, in accordance with embodiments of the present disclosure, a host device hosting an execution environment may, prior to transitioning the environment, notify external devices (e.g., devices to which the environment has a stateful network connection) that connection is ending. The host device may illustratively identify external devices based on a connection table maintained at the host device, and utilized to route network data from the execution environment to the external device. In one embodiment, the host device "masquerades" as the execution environment when notifying the external device that a connection is ending, such as by modifying data packets corresponding to the notification to appear to originate from the execution environment. Thus, the external device may recognize the connection has being terminated. The host device may further prevent communications from or to the execution environment, to prevent the environment from gaining knowledge that the external device believes the connection to be terminated (since such knowledge may cause the environment to attempt to reestablish the connection prematurely).

The host device may then transition the execution environment, either in state (e.g., to a secondary memory of the host device) or in location (e.g., to another host device). On reactivating the environment, the host device may notify the environment that each connection (believed by the environment to still be active) is terminating. In one embodiment, the host device "masquerades" as the external device when notifying the execution environment that a connection is ending, such as by modifying data packets corresponding to the notification to appear to originate from the external device. Thus, the environment may also recognize the connection as being terminated, synchronizing its knowledge of the connection with the external device.

Because the above interactions enable both the external device and the execution to have the same knowledge of the connection (as terminated), the environment may then reestablish the network connection to the external device, if necessary, while avoiding any extraneous communications based on non-synchronized knowledge (which would be expected to result in errors). Any stateful connections of the environment can therefore be gracefully reestablished after transitioning of the environment.

While alternative techniques may exist to gracefully maintain or reestablish stateful network connections on a transitioning execution environment, these techniques may not be preferable on an on-demand code execution system as disclosed herein. For example, during migration of a virtual machine, it may be possible to maintain network connections by utilizing virtual networking or tunneling technologies to redirect network traffic from a prior host device hosting an environment to a new host device. Illustratively, the prior host device may be configured to receive network packets directed to an environment from an external device, and to route the packets to the new host device for delivery to the environment. However, network redirection generally incurs additional latency and overhead in terms of compute resources used to facilitate such redirection. This additional latency and overhead can be particularly problematic in production environments intended to operate at low latencies, like an on-demand code execution system. Moreover, such tunneling or rerouting would generally be insufficient to handle reestablishment of stateful network connections in the instance that of an environment being transitioned to an inactive state for a relatively long duration of time (e.g., longer than a timeout value for the network connection). Thus, the embodiments disclosed herein for gracefully terminating and reestablishing network connections may be preferable to rerouting or tunneling techniques.

As will be appreciated by one of skill in the art in light of the present disclosure, the embodiments disclosed herein improves the ability of computing systems, such as on-demand code execution systems, to execute code in an efficient manner. Specifically, embodiments of the present disclosure increase the efficiency of computing resource usage of such systems by enabling execution environments to be transitioned to lower tier memory, while maintaining the ability of such systems to execute code rapidly in response to requests to do so. Further, embodiments of the present disclosure decrease the occurrence of errors in on-demand code execution systems, by enabling graceful recovery of stateful network connections in environments hosted by such systems. Moreover, the presently disclosed embodiments address technical problems inherent within computing systems; specifically, the limited nature of computing resources with which to execute code, the inefficiencies caused by maintaining unutilized environments in an executing state, and the difficulties of maintaining stateful network connections during transitions of execution environments. These technical problems are addressed by the various technical solutions described herein, including the selective transitioning of environments to lower tier memories based on a time until a next expected utilization of such an environment, and the graceful recovery of network connections for the environment by utilization of a host device to notify either or both an external device and the environment that each network connection has terminated. Thus, the present disclosure represents an improvement on existing data processing systems and computing systems in general.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

Because the number of different virtual machine instances that a host computing device may execute is limited by the computing resources of that host (and particularly by highly utilized resources such as CPU cycles and RAM), the number of virtual machine instances in a pool on the on-demand code execution system is similarly limited. Thus, in accordance with the embodiments of the present disclosure, the on-demand code execution system may generate execution environments for a large number of tasks (e.g., more environments than could be maintained as executing on the on-demand code execution system at a given point in time), and transition a subset (e.g., a majority) of those environments into lower tier memory storage, based on a next expected utilization of each environment. Thus, a primary memory of the on-demand code execution system can be expected to hold environments either being actively used or expected to be used in a very short amount of time. As environments within the primary memory become idle, the on-demand code execution system can transition the environments to secondary memory based on future expected use, and move into primary memory those environments which are next expected to be used. In this manner, the overall efficiency of primary memory within the on-demand code execution system is increased.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task (which may also be referred to as a request to execute the task) may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 148 described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. For example, calls may be distributed to load balance between frontend 120. Other distribution techniques, such as anycast routing, will be apparent to those of skill in the art.

The on-demand code execution system further includes one or more worker managers 140 that manage the execution environments, such as virtual machine instances 150 (shown as VM instance 150A and 150B, generally referred to as a "VM"), used for servicing incoming calls to execute tasks, and that manage the memory states of execution environments. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance). The active pool 148 illustratively is implemented using primary memory (e.g., RAM) of host devices implementing or under control of the worker manager 140.

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As another example, the tasks of the group may share common dependencies, such that an environment used to execute one task of the group can be rapidly modified to support execution of another task within the group.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. In some instances, each VM 150 may be associated with additional information, such as state information, maintained across individual executions of a task. For example, when initially created, a VM 150 may initialize the OS 152, and each time the user code 156 is executed in the VM 150, a state of the VM 150 may change. State of a VM 150 may be maintained, for example, within registers of a virtual CPU of the VM 150, within RAM of the VM 150, within a virtual disk drive of the VM 150, or the like.

In accordance with embodiments of the present disclosure, the worker manager 140 further includes a management unit 142, configured to manage a state of the VMs 150. Specifically, the management unit 142 may be configured to detect an idle VM 150 within the active pool 148 and to determine, based on an expected next use of that VM 150, whether to transition the VM 150 to a secondary memory 144. The secondary memories 144 can correspond to one or more lower tier memories, which are less rapid than primary memory, but which are illustratively greater in capacity. The secondary memories 144 can correspond, for example, to 3D XPOINT, flash memory, magnetic storage, or network-attached storage. Specifically, the management unit 142 can be configured to calculate a next expected use of a VM 150 (e.g., when a next request to execute a task within the VM 150 will be received), and to calculate both (i) a cost of maintaining the VM 150 within the active pool 148 until that next expected use and (ii) a cost of transitioning the VM 150 to one of the secondary memories 144 and back into the active pool 148 so that it is available at the time of the next expected use. If the cost of transitioning the VM 150 into a secondary memory 144 is less than a cost of maintaining the VM 150 within the active pool 148, the management unit 142 can transition the VM 150 into the secondary memory 144. The management unit 142 can later transition the VM 150 back into the active pool 148 as required to service a next request to execute a task in the VM 150. For example, the management unit 142 may time a transition of the VM 150 from the secondary memory 144 to the active pool 148 such that the transition completes at or just prior to an expected time of the request. In instances where a request is received before that expected time, the management unit 142 may transition the VM 150 earlier, such as immediately (e.g., on receive of the request) or as space is available within the active pool 148.

To assist in transitioning of VMs 150 between active pool 148 and secondary memory 144, the worker manager 140 of FIG. 1 further includes a memory utilization monitor 146, configured to monitor memory utilization of various VMs 150 on the worker manager 140 (e.g., on one or more host devices implementing the worker manager 140). In one embodiment, the memory utilization monitor 146 monitors the memory utilization of a VM 150 within a primary memory of the worker manager 140. In another embodiment, the memory utilization monitor 146 monitors an amount of difference (or "delta") between a memory of a VM 150 in primary memory of the worker manager 140 and a representation of that VM 150 within secondary memory 144. For example, in some embodiments, the worker manager 140 may maintain in secondary memory 144 a snapshot (or other data representation) of a VM 150, even when that VM 150 is executing within the active pool 148. Illustratively, the snapshot may have been previously utilized to generate the VM 150 within the active pool 148. The memory state of the VM 150 within the active pool 148 and the snapshot of the VM 150 in the secondary memory 144 may include a substantial amount of information. For example, a VM 150 may be loaded with a runtime 154 which, on initialization, utilizes a given set of memory space (e.g., 100 megabytes). When executing user code 156 in the runtime 154, some subset of that memory space may be modified based on execution of the user code (e.g., 10 megabytes). This memory utilized during execution of a task can represent the "working set" of memory of the task. Thus, if a snapshot of the VM 150 is taken just after initialization and prior to execution of user code 156, the snapshot and a state of the VM 150 after execution of a task would be expected to overlap by 90 megabytes (the initial utilization minus the working set). Due to this overlap, a new snapshot of the VM 150 after execution of a task may be created in the secondary memory 144 based on transferring out of the working set of the VM 150 within the active pool 148, without requiring that all memory of the VM 150 be transferred from the active pool 148. The remaining memory of the VM 150 may be identified by reference to the preexisting snapshot of the VM 150. Such interdependent snapshots are generally referred to as "cascading snapshots." Thus, the memory utilization monitor 146 in one configuration of the system 110 tracks the "delta" of data needed to transition a VM 150 from the active pool 148 to a secondary memory 144.

As noted above, the management unit 142 can be configured to determine when to transition a VM 150 to secondary memory 144 based on a next expected utilization of the VM 150 to execute a task. To facilitate determination of the next expected utilization, the system 110 further includes a call history data store 164, which stores information regarding a history of calls to the system 110 of tasks. Illustratively, each time the frontend 120 receives a call to execute a task, the frontend 120 may update a record within the call history data store 164 (e.g., within a database) to reflect that call. The management unit 142 may utilize the call history of a task to predict a next execution of that task or similar tasks. In some instances, the management unit 142 may generate statistical information regarding the call history of a task, such as a median or mean duration between calls, a standard deviation of that duration, an interquartile range of that duration, or the like. Such statistical information may also be stored within the call history data store 164. The call history data store 164 may correspond to any persistent or substantially persistent data storage device, including (but not limited to) hard disk drives, solid state disk drives, network attached storage, etc., or any combination thereof.

In addition, the management unit 142 may further be configured to facilitate graceful termination of stateful network connections of VM instances 150 in connection with transitioning of the VM instances 150 in memory state or location. Specifically, as will be described below, the management unit 142 may be configured to determine a set of stateful network connections of a VM instance 150, such as by inspecting a connection table or data set maintained by a host device hosting the VM instance 150. The management unit 142 may then transmit, to each "end" of each connection (e.g., the instance 150 and a device external to the instance, such as another instance 150, an auxiliary service 106, etc.) a termination signal indicating that the connection has terminated. Subsequent to reactivation of the instance 150, a task executing on the instance 150 may then function to reestablish each required network connection, based on shared knowledge between the instance 150 and each external device that the respective connections have been terminated.

In one embodiment, the management unit 142 notifies external devices of termination of each connection prior to or during deactivation of a VM instance 150 on a host device initially hosting the instance. Notifying external devices of termination during or prior to deactivation may be beneficial, for example, in allowing external devices to close the network connections, rather than consider such connections "open" until a timeout event occurs. Moreover, when a VM instance 150 is transitioning locations (e.g., migrating from a first to a second host device), notifying external devices from the first host device may beneficially increase the likelihood that a termination signal is accepted by the external device as authentic, since the first host is the same physical computing device that has previously transmitted data to the external device on behalf of the VM instance 150 (and, for example, has been assigned the IP address previously used in communications with the external device).

Conversely, the management unit 142 may be configured to notify the VM instance 150 of termination of each connection during re-activation of the VM instance 150 (e.g., as a final stage of migration to a second host, during re-inclusion in the active pool 148, etc.). Illustratively, the VM instance 150 may be halted at a point at which it is executing code of a task, which code is configured on detection of a connection termination to attempt to reestablish the connection. Thus, if a termination signal were transmitted to the VM instance 150 prior to halting, a "race condition" might occur, where the VM instance 150 attempts to reestablish a network connection at the same time that the management unit 142 is attempting to transition the VM instance 150. To avoid this, the management unit 142 may halt the VM instance 150 without notifying the instance 150 of any network connection termination. When the VM instance 150 is halted without receiving a termination of the connection, the code may assume that the connection is active. Thus, on reactivation of the VM instance 150, the management unit 142 may notify the VM instance 150 that each connection has been terminated, thus causing the VM instance 150 to reestablish those connections as necessary.

While illustrative timings for transmissions of termination signals are discussed above, these timings may be modified in embodiments of the present disclosure. For example, a management unit 142 may transmit termination signals to both external devices and a VM instance 150 prior to removing the instance 150 from an active pool 148. In this embodiment (or additionally in the other embodiments disclosed herein), the management unit 142 may be configured to block communications between the VM instance 150 and external devices, to prevent the instance 150 or external device from reestablishing a network connection prior to transitioning the instance 150. Additionally or alternatively, the management unit 142 may transmit termination signals to both external devices and a VM instance 150 after transitioning the instance 150 back into an active pool 148.

In some embodiments, the management unit 142 may be configured to transmit termination signals to each end of a stateful network connection of a VM instance 150 at least partly by masquerading as the opposing end of the connection. Specifically, the management unit 142 may execute to control operation of a hypervisor, "DOM 0," or lower-level operating system of a host device hosting a VM instance 150, which may necessarily (by virtue of hosting the instance 150) act as a "middle man" between the VM instance 150 and each external device. Due to this position, the host device may generate packets for transmission to an external device that are similar or identical to those that an instance 150 would transmit to the external device. Similarly, the host device may generate packets for transmission to an instance 150 that are similar or identical to those that an external device would transmit to the instance 150. The management unit 142 may thus control operation of a host device to "masquerade" as one party to a network connection with speaking with the other party, increasing the likelihood that the spoken-to party accepts a transmission as legitimate.

While some functionalities are generally described herein with reference to an individual component of the on-demand code execution system 110, other components or a combination of components may additionally or alternatively implement such functionalities. For example, while each worker manager 140 is depicted in FIG. 1 as including a management unit 142, in some instances, one or more centralized state management units 142 may be provided which provide access to the above-described functionalities to multiple worker managers 140. In instances where the worker manager 140 is implemented across multiple host devices, each host device may include a management unit 142, or multiple devices may share access to a common management unit 142 (e.g., executed on a physically nearby device, such as a device on the same "rack" within a data center). In some instances, the call history data store 164 may be implemented locally within a worker manager 140. For example, where each worker manager 140 is configured to handle a specific subset of tasks on the system 110, each worker manager 140 may maintain a call history of that specific subset of tasks. Thus, the specific configuration of elements within FIG. 1 is intended to be illustrative.

Figure 2:
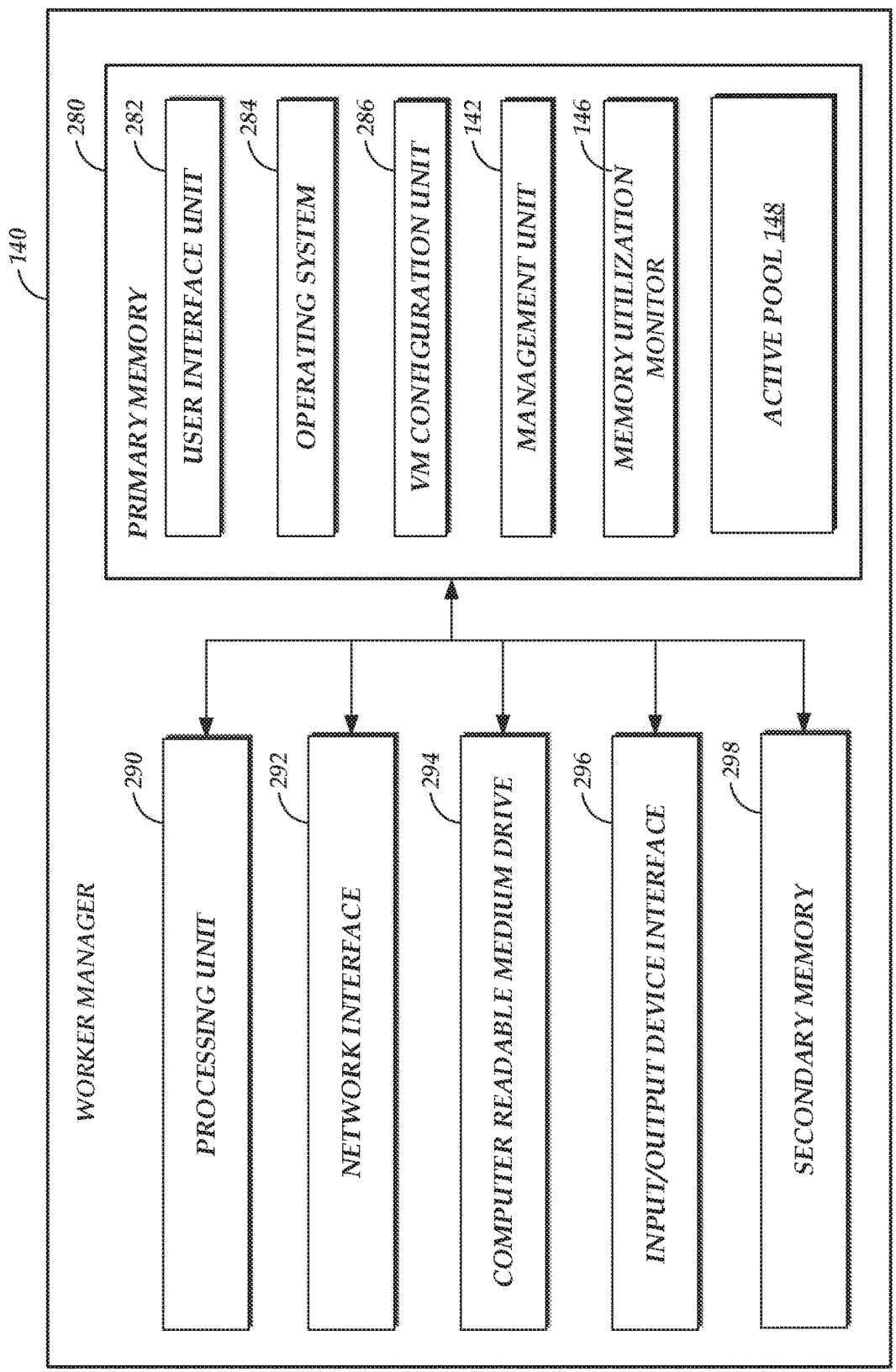
FIG. 2 depicts a general architecture of a computing device providing a worker manager on the on-demand code execution system of FIG. 1, which may function to manage a memory state of an execution environment based on an expected timing of a next execution of code provisioned within the execution environment.

FIG. 2 depicts a general architecture of a computing system implementing a worker manager 140 of FIG. 1. The general architecture of the worker manager 140 depicted in FIG. 2 includes an arrangement of computer hardware and software that may be used to implement aspects of the present disclosure. The hardware may be implemented on physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the worker manager 140 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298. As noted above, the secondary memory 298 may include multiple tiers of memory, each lower representing a progressively lower speed but potentially higher capacity than a prior tier.

The primary memory 280 illustratively includes the active pool 148, which may store information regarding virtual machine instances that are actively executing on the worker manager 140. While shown as part of primary memory 280, use of the term "active pool" may in some instances also refer to a logical construct including the VMs 150 executing on a worker manager 140. These VMs 150 within the active pool 148 may additionally utilize other resources of the worker manager 140, such as the processing unit 290, the network interface 292, etc. Thus, inclusion of the "active pool 148" within primary memory 280 is intended to visually represent a portion of the primary memory 280 utilized by VMs 150 within the active pool 148, and not as an indication that such VMs 150 solely utilize the primary memory 280.

The primary memory 280 may further store an operating system 284 that provides computer program instructions for use by the processing unit 290 in the general administration and operation of the sidecar configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a virtual machine configuration unit 162, management unit 142, and memory utilization monitor 146. In one embodiment, the virtual machine configuration unit 162, management unit 142, and memory utilization monitor 146 individually or collectively implement various aspects of the present disclosure, e.g., generating virtual machine instances in which to execute code in response to requests for such execution, monitoring memory usage of such machines within the primary memory 280, and selectively transitioning VMs 150 out of primary memory 280 and into secondary memory 298 based on a next expected use of the VM 150 to execute a task within the system 110.

The worker manager 140 of FIG. 2 is one illustrative configuration of such a device, of which others are possible. For example, while shown as a single device, a worker manager 140 may in some embodiments be implemented as multiple physical host devices. Illustratively, a first device of such a worker manager 140 may implement "control plane" functions, such as receiving requests to execute tasks, instructing when to transition VMs 150 between memory states, and the like, while a second device may house the active pool 148 and implement "data plane" operations, such as executing code in response to instructions by the first device.

In some embodiments, the worker manager 140 may further include components other than those illustrated in FIG. 2. For example, the primary memory 280 may further include a container manager for managing creation, preparation, and configuration of containers within virtual machine instances. Further variations on functionalities of a worker manager 140, any of which may be implanted by the worker manager 140 of the present disclosure, are described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Figure 3:
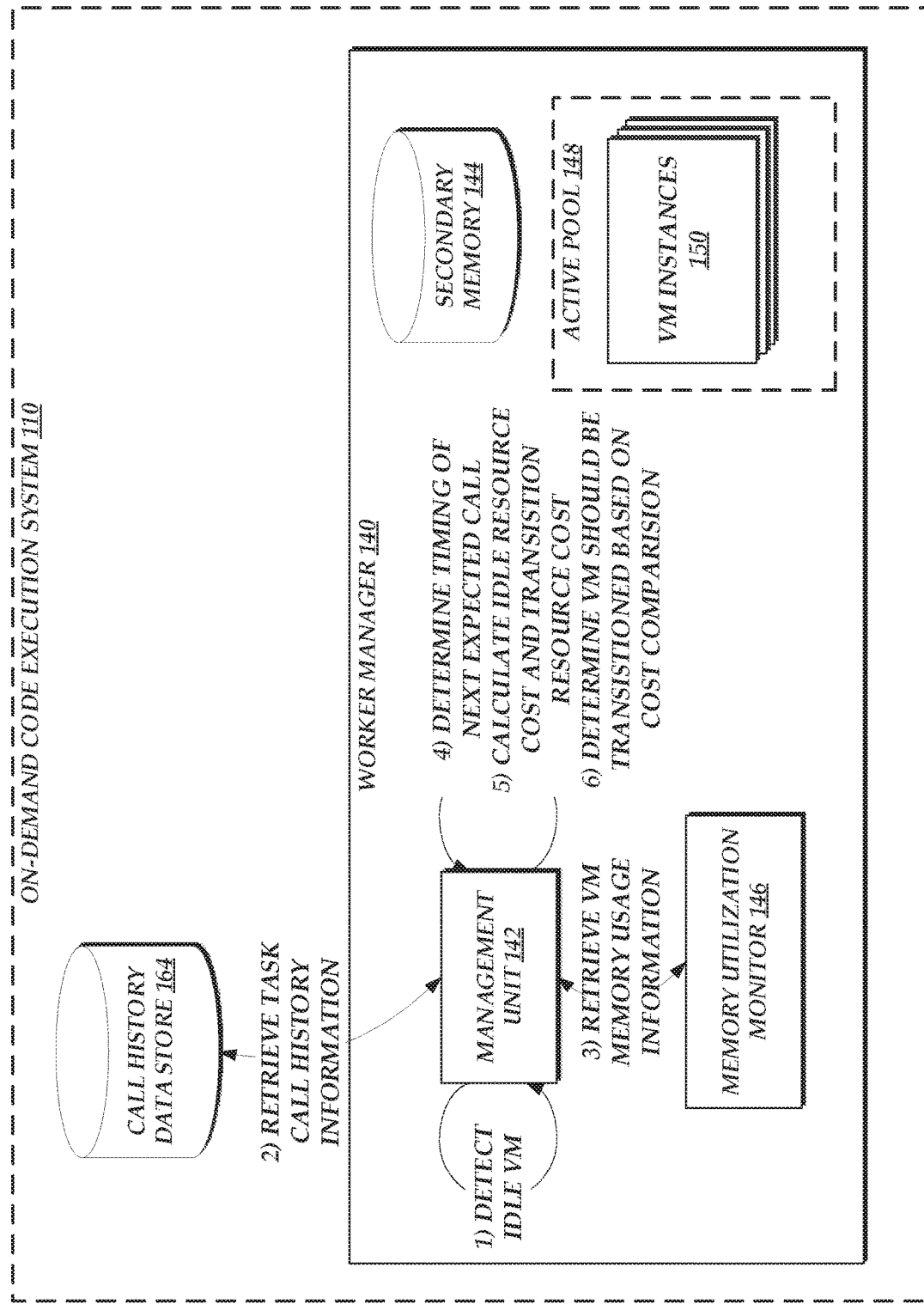
FIG. 3 is a flow diagram depicting illustrative interactions for determining a memory state in which an execution environment should be placed based on an expected timing of a next execution of code provisioned within the execution environment of the on-demand code execution system of FIG. 1.

With reference to FIG. 3, illustrative interactions are depicted for determining whether to transition the memory state of a VM 150 based on a next expected use of the VM 150 to execute a task. The interactions of FIG. 3 begin at (1), where the management unit 142 detects an idle VM 150. In the present description, an idle VM 150 is intended to refer to a VM 150 that is not actively servicing a request to execute a task, such as by executing code of that task. For ease of description, it will be assumed with reference to FIG. 3 that each VM 150 is dedicated to execution of a single task. However, the interactions of FIG. 3 may be modified to include VMs 150 made available to execute multiple tasks (e.g., of the same user, utilizing the same libraries, etc.). Illustratively, the management unit 142 may detect an idle VM 150 by receiving an indication that the VM 150 has completed execution of a task, and determining that no outstanding requests for execution of that task exist on the worker manager 140.

Thereafter, at (2) and (3) (which interactions are described in sequence but may be implemented concurrently, in parallel, in the reverse order, etc.), the management unit 142 retrieves task call history information from the call history data store 164, and VM memory usage information from the memory utilization monitor 146, respectively. As noted above, the task call history information may include a record of requests to execute a task (or one or more similar tasks) and/or statistical information related to such a record. The VM memory usage information can include a current amount of primary memory utilized by a VM 150, and/or a delta indicating how much information must be transitioned out of primary memory to transition the VM 150's state.

At (5), the management unit 142 determines a timing of a next expected call to execute a task within the VM 150, based on the call history information. In instances where the call history information shows variations in the durations between calls, the management unit 142 can use a statistical measurement to calculate an expected time until a next call to execute the task. In one embodiment, the expected time is calculated based on a probability that, if a next call conforms to the distribution of past calls, that the next call will occur no earlier than a given point in time. Illustratively, a statistical analysis of the call history information may indicate that there is a 99% chance according to the historical distribution of calls that a next call occurs no earlier than 10 seconds from the current point in time, a 90% chance that the next call occurs no earlier than 30 seconds from the current point in time, a 50% chance that the next call occurs no earlier than 60 seconds from the current point in time, etc. As such, the worker manager 140 may be configured to utilize such a probability threshold to establish an expected timing of a next call. For example, the worker manager 140 may be configured to utilize an expected timing such that there is a predicted n % chance that the next call occurs no earlier than the expected timing. In some instances, the specific percentage may vary based on a user associated with the task executed within the VM 150 at issue. For example, specific users may require very low latency completion of requests, and thus may establish a high percentage value for calculating a next expected call. This can generally reduce the expected timing of a next call, and inhibit transferring of a VM 150 out of the active pool 144. Conversely, other users may not require low latency completion of requests, and may thus establish a low percentage value for calculating a next expected call, leading to more aggressive transferring of a VM 150 to secondary memory 144. In either instance, should a request to execute a task come before the next expected utilization, the worker manager 140 can transition the VM 150 out of secondary memory 144 at the time of the request. Thus, such requests may still be serviced, but may incur additional latency due to the need to transition the VM 150 out of secondary memory 144 at the time of the request.

At (4), the management unit 142 calculates expected costs for maintaining the VM 150 within the active pool 148, as well as for transitioning the VM 150 into a secondary memory 144. Generally described, the cost of maintaining a VM 150 within the active pool can be calculated as a sum of the resources of the worker manager 140 to maintain the VM 150 within the active pool 148 for the period of time until a next expected call to execute a task within the VM 150. For example, where an executing VM 150 within the active pool utilizes CPU cycles and RAM, the cost of maintaining the VM 150 within the active pool 148 can represent a combination of total CPU cycles expected to be utilized until the next expected call and a metric reflecting RAM usage over time (e.g., "megabyte-seconds"). The worker manager 140 can be configured to weight each metric according to a relative scarcity of the corresponding resource, and combine the metrics via a weighted linear equation. For example, where a worker manager 140 has excess CPU cycles but limited RAM, the metric of RAM usage over time may be weighted more highly than CPU cycles. A combination of these two metrics (potentially along with other metrics reflecting other resources used by an executing VM 150) can represent the cost of maintaining the VM 150 within the active pool.

Similarly, the cost of transitioning a VM 150 to secondary memory 144 can reflected a weighted combination of the resources needed to transition the VM 150 to the secondary memory 144 from the active pool, and later to transition the VM 150 back from the secondary memory 144 to the active pool to service a next expected request. Such resources can include (but are not limited to) the amount of primary memory used over time to transition the VM 150 in or out of the primary pool, the amount of a communication bus to transition the VM 150 (e.g., the bandwidth over time, which may in some instances be represented as a total amount of data transferred over the bus), and the amount of secondary memory 144 used over time to store the VM 150 within the secondary memory 144. Each resources may be weighted according to the relative scarcity of the resource within the worker manager 140. The total expected use of each resource may further be based on the expected timing of each phase of a transition of a VM 150 into secondary memory 144, including a transition-out phase (e.g., using resources of a primary memory, a secondary memory 144, and a communication bus between the two to transition a VM 150 from the active pool 148 to the secondary memory 144), an idle phase (e.g., using resources of the secondary memory 144 to maintain the VM 150 in the secondary memory 144), and a transition-in phase (e.g., using resources of a primary memory, a secondary memory 144, and a communication bus between the two to transition a VM 150 from the secondary memory 144 to the active pool 148). The worker manager 140 can determine an expected timing of transition-in or transition-out phases based on a theoretical or observed timing of transfer of data between primary and secondary memories, as well as the amount of data needed to be transferred to transfer the VM 150. For example, where 10 megabytes of data is required to be moved between a primary memory and a secondary memory 144 to transfer a VM, and a communication bus between those two memories has an expected speed of 1 gigabyte per second (GB/s) (which may be determined either based on specification of the bus or based on historical observation of bus speed with respect to VM data), the expected transfer-out time may be one one-hundredth of a second (1 GB/s divided by 10 MB).

As noted above, the total amount of data required to transition out a VM 150 can be reduced by maintaining a prior snapshot of a VM 150 within secondary memory 144, and transitioning only a "delta" representing a difference of a currently executing version of that VM 150. Such a technique is generally not suitable for reducing the amount of data required to transition a VM 150 back into the active pool 148, as a goal of the current technique is to reduce resource usage of the active pool 148. However, in many instance, it may not be necessary for all data of a VM 150 to be transitioned from secondary memory 144 to primary memory in order for the VM 150 to execute within the active pool 148. Rather, only a minimum portion of that data (e.g., a state of CPU registers) may be transitioned initially in order to facilitate execution of the VM 150. The remaining data may be transitioned "on read" of the data during execution of a task. For example, as a VM 150 attempts to read a portion of data in virtualized RAM of the VM 150, that portion of data may be moved from secondary memory 144 to a primary memory of the worker manager 140, and passed to the VM 150. Using this technique, the cost of transitioning a VM 150 from secondary memory 144 to the active pool 148 may be reduced considerably. For example, embodiments of the present disclosure may assume, for the purposes of calculating a cost of transitioning a VM 150 into the active pool 148, only the minimum resources needed to facilitate execution of the VM 150. The worker manager 140 may further predict a timing of this "transfer-in" transition as a latest point, before the expected next request, at which the phase-in can occur such that at the time of the expected next request, the VM 150 is executing within the active pool 148 and ready to execute the task.

The resource cost during the "idle" phase of a transition to secondary memory 144 can be calculated as the amount of secondary memory 144 needed to maintain the VM 150 in an inactive state during the period until the next expected request, subtracting the timing expected to be required for the transfer in and transfer out phases. This idle time cost can be weighted according to the resources used and combined with weighted representations of the transfer in and transfer out phase costs to result in a calculated cost of transitioning the VM 150 into secondary memory 144.

In the instance that the worker manager 140 includes multiple tiers of secondary memory 144, the above-noted costs can be calculated for each available tier of secondary memory 144. In general, the cost of resources of each lower tier of secondary memory 144 is expected to be lower (given the expected greater availability of such resources), but the time required to transition in and out a VM 150 from such memory is expected to be higher. Thus, larger more frequently used VMs 150 may incur minimal costs when transitioned to higher tier memories 144, while smaller less frequently used VMs 150 may incur minimal costs when transitioned to lower tier memories 144.

At (6), the management unit 142 compares the previously calculated costs, and determines a desired memory state of a VM 150 based on a minimal calculated cost. Illustratively, where the cost of keeping a VM 150 idle within the active pool 148 is lower than the costs of transitioning the VM 150 to a secondary memory 144, the management unit 142 can determine that the VM 150 should remain within the active pool 148. For the purposes of description, it is assume that at (6) the management unit 142 determines that a cost of transitioning the VM 150 to a secondary memory 144 is less than the cost of keeping the VM 150 idle within the active pool 148. Thus, at (6), the management unit 142 determines that the VM should be transitioned out of the active pool 148 and into secondary memory.

Figure 4:
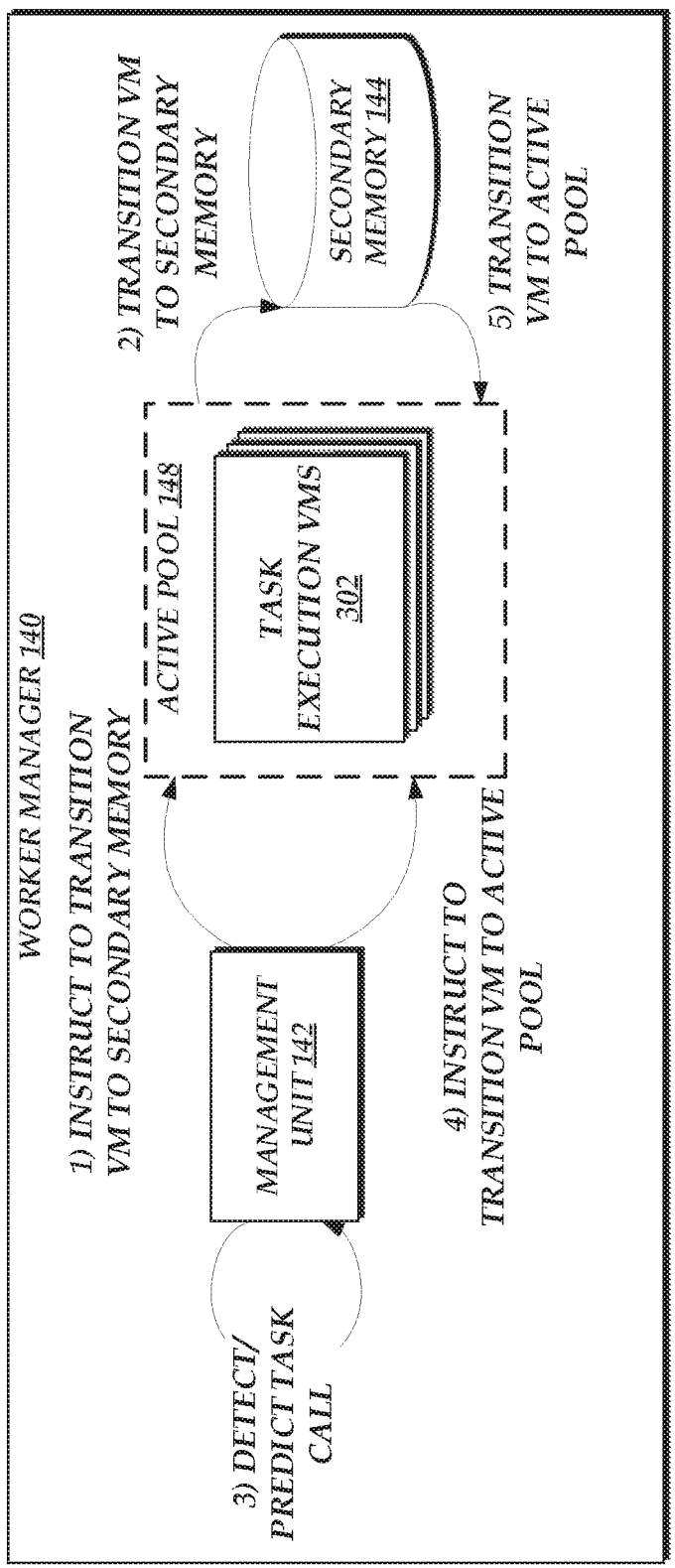
FIG. 4 is a flow diagram depicting illustrative interactions for altering the memory state of an execution environment to reduce computing resource usage of the on-demand code execution system of FIG. 1 while maintaining the ability of the system to rapidly execution of code within the environment.

Illustrative interactions for transitioning a VM 150 from the active pool 148 to a secondary memory 144A, and back into the active pool 148 to service an expected customer request, are depicted within FIG. 4. The interactions of FIG. 4 may illustratively occur subsequent to those of FIG. 4, after the management unit 142 determines that a VM 150 should be transitioned from the active pool 148 to a secondary memory 144.

The interactions of FIG. 4 begin at (1), where the management unit 142 transmits instructions to the active pool 148 to being transitioning a VM 150 from the active pool 148 to the secondary memory 144. In the context of FIG. 4, the transmission of instructions may correspond, for example, to software implementing the management unit 142 transmitting a request to a hypervisor or other "DOM 0" or lower-level operating system to initiate snapshotting of the VM 150.

At (2), the active pool 148 transitions the VM 150 to secondary memory 144. Transitioning of the VM 150 can include, for example, storing a snapshot of the state of the VM 150 within the secondary memory 144. As noted above, the snapshot may be "cascading" and thus reference a prior snapshot of the VM 150 within the secondary memory 144 in order to minimize the data transfer required from a primary memory. Thereafter, the VM 150 can remain in secondary memory 144 until required (or expected to be required), reducing the overall computing resource usage of the worker manager 140.

Thereafter, at (3), the management unit 142 can detect or predict a call to execute a task within the VM 150. Detecting such a call can for example correspond to receiving a request to execute the task, which request may have been transmitted by a user or system external to the on-demand code execution system 110. Predicting a call can for example correspond to detecting that the expected time of a next call (e.g., as used to determine whether to transition the VM 150 to secondary memory 144, illustrative interactions for which are described above with reference to FIG. 3) is imminently approaching, such that a transition-in phase for the VM 150 should begin to ensure that the VM 150 is ready to execute the task at the expected time of the next call.

In response to detecting or predicting a next call, the management unit 142 at (4) instructs the active pool 148 to transition the VM 150 from the secondary memory 144 to the active pool 148. In one embodiment, such instructions correspond to instructing a hypervisor or other host operating system to initialize the VM 150 based on a snapshot of the VM 150 within the secondary memory 144. At (5), the active pool 148 transitions the VM 150 to the active pool 148, placing the VM 150 in an executing state. Thus, the VM 150 can be rendered ready to receive a call to execute the task at the expected time of that call, enabling total resources used on the worker manager 140 to be reduced relative to maintaining the VM 150 in the active pool 148 in an idle state, while minimally or not impacting responsiveness of the VM 150 to requests to execute the task.

Figure 5:
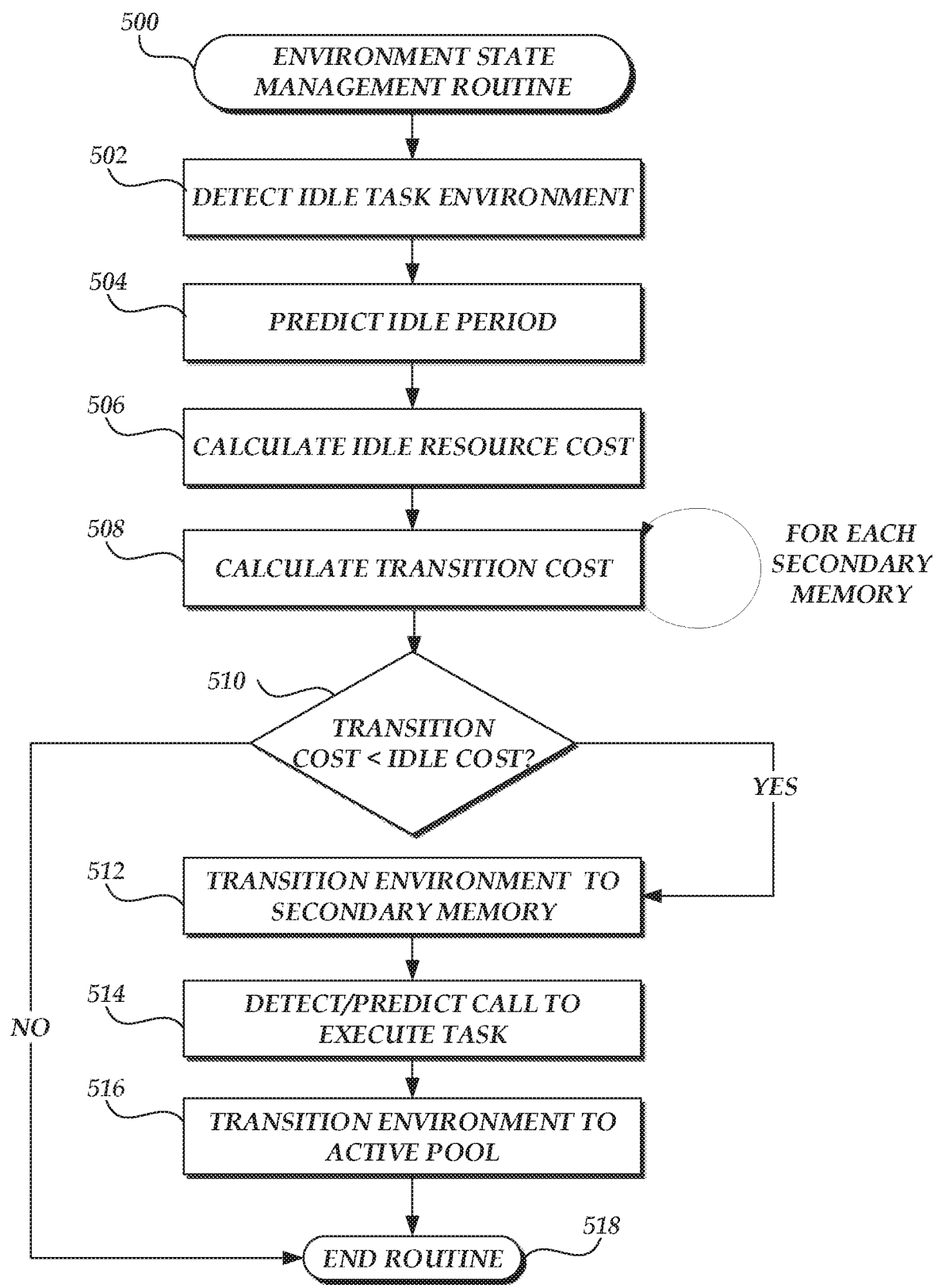
FIG. 5 is a flow chart depicting an illustrative routine for modifying a memory state of an execution environment within the on-demand code execution system of FIG. 1 based on an expected timing of a next execution of code provisioned within the execution environment.

With reference to FIG. 5 one illustrative routine 500 for managing a memory state of an execution environment, such as a VM 150, based on an expected next use of the environment to execute a task on the on-demand code execution system 110 will be described. The routine 500 may be carried out, for example, by the worker manager 140 of FIG. 1 (e.g., by use of the management unit 142).

The routine 500 begins at block 502, where the worker manager 140 detects an idle environment associated with a task. Detection of an idle environment can correspond, for example, to detecting that an execution of the task has completed, and that no additional requests to execute the task are pending.

The routine 500 then continues to block 504, where the worker manager 140 predicts an idle period for the environment, corresponding to an amount of time until a next request to execute the task within the environment. As discussed above, the idle period may be predicted based on statistical analysis of call history information for a task. Illustratively, the idle period may be calculated from a past distribution of times between calls. For example, the idle period may be calculated such that there is a n % chance that a call is not received before the expiration of the idle period. In some instances, additional statistical analysis, such as a regression analysis, may be applied to determine an expected idle period based on other factors, such as a time-of-day. For example, call history may indicate that a given task is called frequently during business hours but infrequently during nighttime hours. A regression analysis of historical information can thus be used to determine a relationship between current time and a period between calls, which can be applied to a current time (e.g., a time of implementing the routine 500) to determine an expected next call to execute a task. In some instances, such statistical analysis may not be required, and other information may be used to predict a time of a next request to execute a task. For example, where the system 110 is configured to execute a task with a set periodicity (e.g., every minute), the idle period can be calculated from that periodicity, without requiring statistical analysis of historical calls.

The routine 500 continues to block 506, where the worker manager 140 determines an expected resource cost of maintaining the environment in an executing state within primary memory. As noted above, the resource cost may be represented as based on the "resource time" of each resource used to maintain the environment in an idle state (e.g., as a time-factored metric). For example, the RAM usage of an environment may be measured in "megabyte-seconds," or the amount of megabytes used to maintain the environment in an idle state multiplied by the seconds during which the megabytes would be used (e.g., assuming the predicted idle period is correct). As another example, CPU usage may be measured in CPU cycles, bandwidth may be measured in total data transferred, etc. In one embodiment, each resource time is weighted according to the value or scarcity of the resource and used to calculate an overall (e.g., resource agnostic) cost for maintaining the environment in an idle state.

Similarly, at block 508, the worker manager 140 determines an expected resource cost for transitioning the environment to secondary memory during an idle period, and back into primary memory at a time of a request to utilize the environment, or just prior to that request being expected. As with the cost of block 506, the transition cost may be calculated as a weighted combination of resource time for each resource used to transition the environment. Illustratively, the transition cost account for resources used to transfer out an environment from primary memory, maintain the environment in secondary memory, and transfer in the environment back into primary memory to execute code within the environment. Block 508 may be repeated for each potential secondary memory. As noted above, because the speed of each tier of secondary memory is expected to vary, the costs of transferring an environment to each tier is also expected to vary. However, these costs may not vary with any particular aspect of an environment, but rather with a combination of numerous factors, including the amount of data needed to be transferred for an environment (e.g., the "working set") and the expected time until next use of that environment.

At block 510 of the routine 500, the worker manager 140 conducts a comparison of the costs calculated in the above-noted blocks 506 and 508, and determines whether the cost to transition the environment to a secondary memory is less than the cost of maintaining the environment idle within primary memory. If block 510 evaluates to false, the routine 500 proceeds to block 518 and ends. This scenario illustratively corresponds to an instance in which a next call to utilize the environment is expected to come relatively quickly, and/or where the cost of transitioning the environment to a secondary memory is very high (e.g., the environment has a large working set of memory). In such an instance, maintaining the environment within primary memory may represent the most efficient use of resources on the system 110.

Alternatively, if block 510 evaluates to true, the routine 500 continues to block 512, where the worker manager 140 transitions the environment to the secondary memory associated with a lowest expected cost. Where the environment is a virtual machine, such a transition can include snapshotting the environment and storing the snapshot in the secondary memory. Where the environment is a software container or other software construct, such a transition can include checkpointing or "freezing" the environment and storing the checkpoint within the secondary memory.

Thereafter, at block 514, the worker manager 140 detects or predicts a call to execute the task associated with the environment. Detecting the call can correspond to receiving an instruction or request to execute the task. Predicting a call can correspond to determining that the predicted idle period of the environment (e.g., as determined at block 504) is nearing completion, such that a transition of the environment into primary memory should begin to enable the environment to be executing at the time when the predicted idle period ends. Thus, at block 516, the worker manager 140 transitions the environment back into primary memory, and sets the environment to executing within the active pool 148. Where the environment is a virtual machine, transitioning the environment may include recreating the virtual machine from the snapshot. Where the environment is a software container or other construct, transitioning the environment may include restoring the container or construct from a checkpoint. In either instance, transitioning the environment may rely on functionality to transition data of the environment on an as needed basis, minimizing the amount of data that must be transmitted between the secondary memory and the primary memory to place the environment in a working state. The environment can then facilitate execution of a task within the environment.

Thus, by implementation of the routine 500, the overall computing resource usage of the system 110 with respect to an environment during an idle period can be reduced, while maintaining the ability of the system 110 to rapidly service requests to execute code within the environment. Indeed, where a subsequent request to utilize an environment is received at or after the expected next use of the environment, the total time of the system 110 to begin execution of a task is expected to be unchanged. However, because at least a portion of the idle time of the environment is spend stored in secondary memory, primary memory of the system 110 can be freed during that idle time to facilitate other executions of tasks. Thus, the overall capacity of the system 110 to execute tasks can be increased.

Figure 6A:
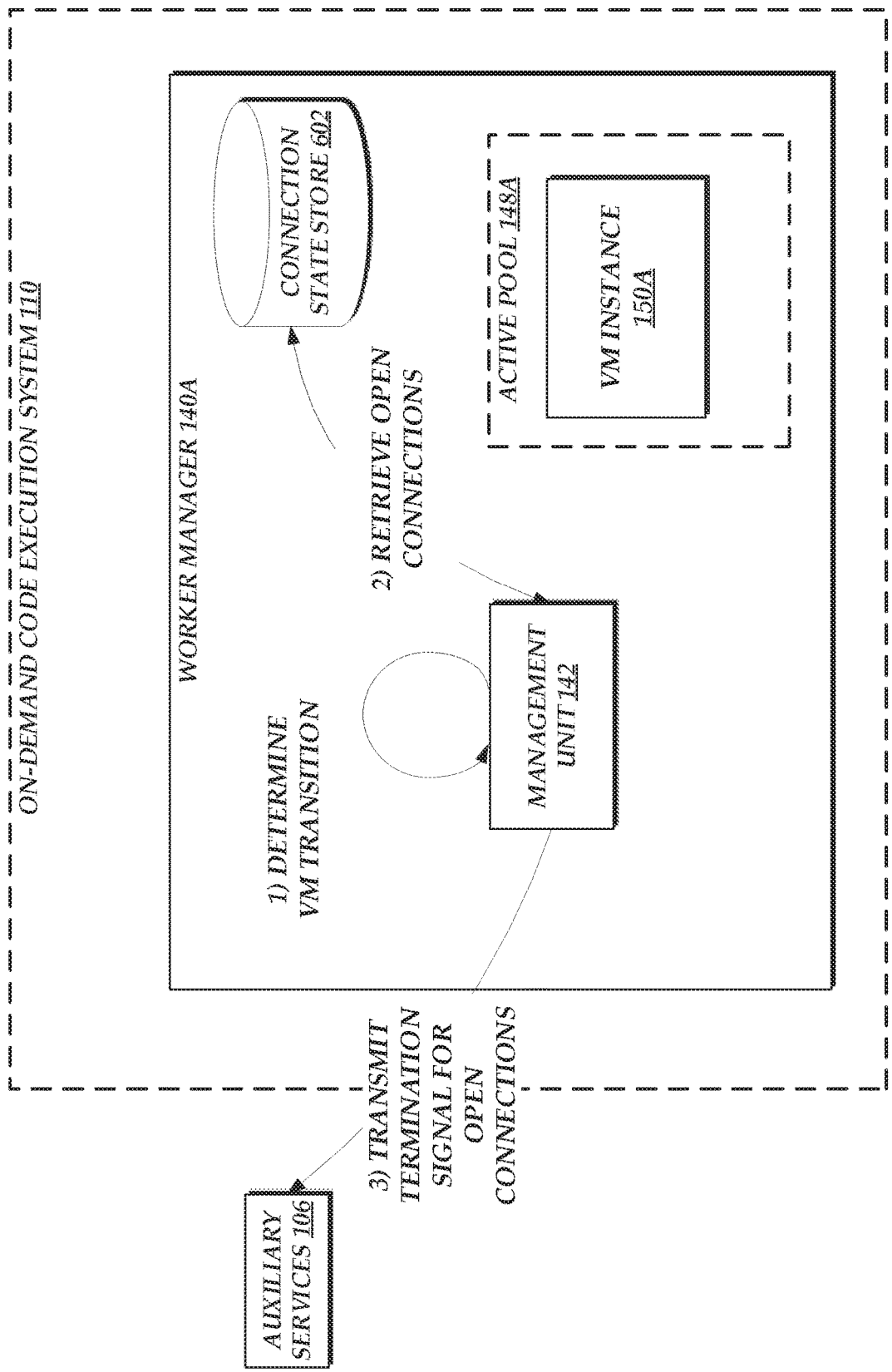
FIG. 6A is a flow diagram depicting illustrative interactions for ending an external side of stateful connections of a virtual machine instance on an on-demand code execution system to prepare for migration of that virtual machine instance.
Figure 6B:
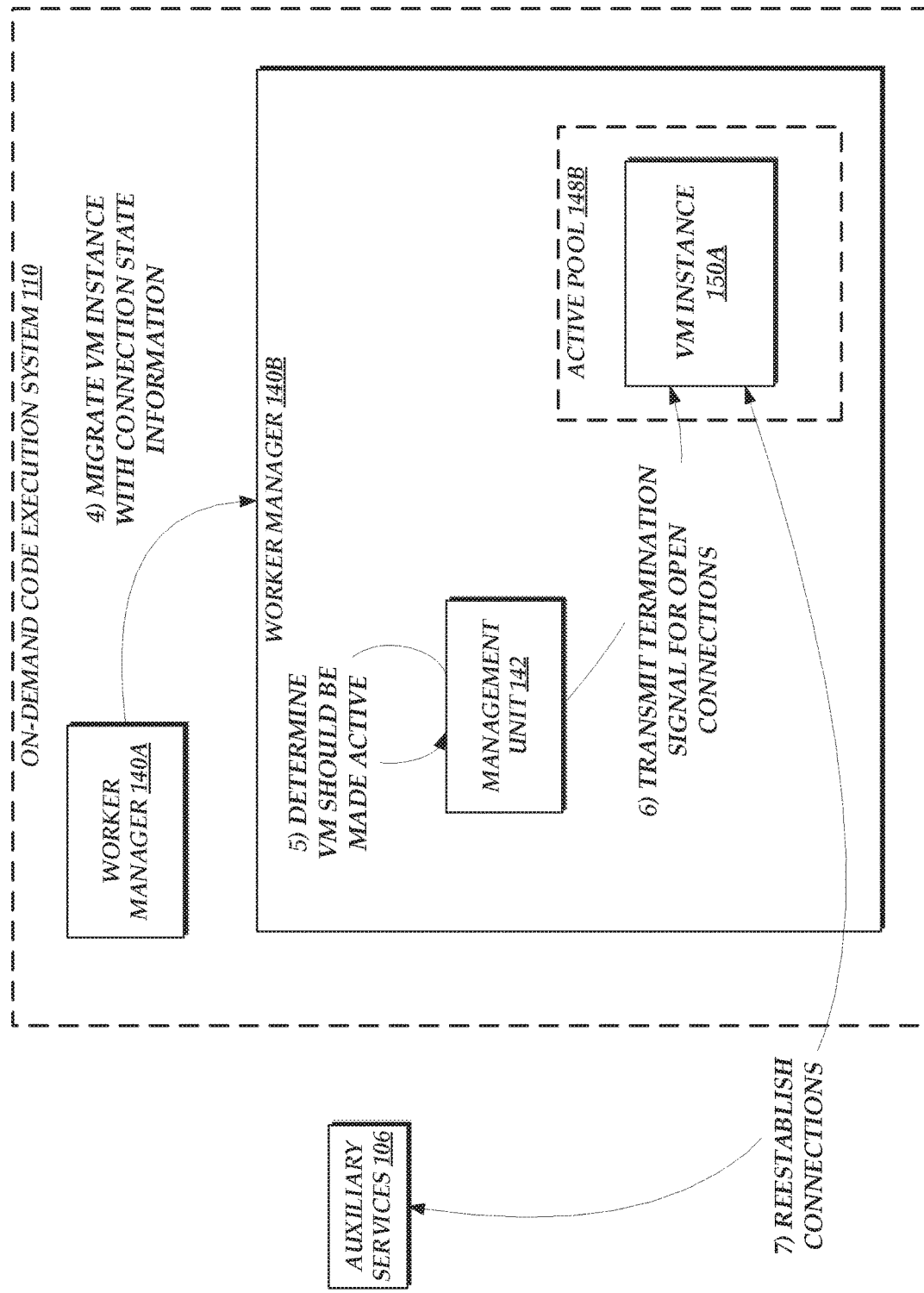
FIG. 6B is a flow diagram depicting illustrative interactions for ending an internal side of stateful connections of a virtual machine instance on an on-demand code execution system to prepare for activation of that virtual machine instance, and for reestablishment of stateful connections after activation.

With reference to FIGS. 6A and 6B, illustrative interactions will be described for gracefully recovering network connections after transitioning of a VM instance 150 between state or host devices. Specifically, FIG. 6A depicts illustrative interactions undertaken on a first worker manager 140A, representing at least one first host device, to notify external devices that each stateful network connection to a VM instance 150A is terminated. FIG. 6B depicts illustrative interactions to migrate the VM instance 150A to a second worker manager 140B representing at least a second host device, and to notify the VM instance 150A that each stateful network connection has been terminated, enabling the VM instance 150A to reestablish such stateful network connections. While the interactions of FIG. 6A and 6B are depicted as occurring in conjunction with migration of a VM instance 150 to a different host device, similar interactions could be undertaken on a single host device to facilitate transition of the VM instance 150 between memories (e.g., to facilitate halting the VM instance 150 for a substantial period of time likely to cause timeouts).

The interactions of FIG. 6A begin at (1), where the management unit 142 determines that the VM instance 150A is to be transitioned. In some instances, the management unit 142 may determine that such a transition is to occur based on the interactions described above (e.g., based on determined that a next expected use of the instance 150 exceeds a given value). In other instances, the management unit 142 may determine that such a transition is to occur based on receiving instructions from another device or component. For example, the management unit 142 may receive instructions from an administrator or control plane device that the instance 150 should be migrated to another worker manager 140.

At (2), the VM instance 150A retrieves from a connection state store 602 of the worker manager 140A information identifying current stateful network connections of the VM instance 150. The connection state store 602 may be implemented within memory of the worker manager 140A (e.g., a primary memory and/or secondary memory 144), and reflect network information used by the worker manager 140A to handle network traffic to and from the VM instance 150A. Illustratively, the connection state store 602 may reflect a "state table" or other table maintained by a hypervisor, "DOM-0," lower-level operating system, virtual switch, or the like, which reflects how traffic is routed from a physical network connection of a host device to various execution environments on the host device. Because the host device maintains that physical network connection, it may necessary operate as a middle-man between each VM instance 150 and a physical network, thus enabling the host device to maintain knowledge of network connections of each VM instance 150 to external devices (e.g., external to the VM instance 150). Thus, by inquiry to the connection state store 602, the management unit 142 can receive information identifying open connections of the VM instance 150A. In some embodiments, this information may be received independent of communications with the VM instance 150A.

Thereafter, at (3), the management unit 142 transmits, for each open connection of the VM instance 150A, a termination signal to the other party of the connection. Illustratively, if the VM instance 150A has an active TCP connection to a given auxiliary service 106, the management unit 142 may transmit a termination signal (e.g., a TCP reset packet) to the auxiliary service 106. Illustratively, the management unit 142 may instruct a hypervisor or other low-level operating system to transmit the signal, or may generate and transmit the signal itself. In one embodiment, the management unit 142 "masquerades" as the VM instance 150A in order to send the termination signal, such as by altering aspects of the termination signal to match what would be expected from such a signal if generated at the VM instance 150A. Illustratively, the management unit 142 may alter a source network address to match an address of the VM instance 150A, or modify a sequence number to match a current sequence number for the connection (e.g., as indicated in the connection state store 602). Thus, each other party to a stateful network connection of the VM instance 150A will understand that such connection has terminated.

In one embodiment, the interactions of FIG. 6A may occur without notification to the VM instance 150A. Thus, from the point of view of the VM instance 150A, each network connection will be understood to remain open.

Beneficially, this may prevent the VM instance 150A from attempting to reestablish the connections. In some instances, the management unit 142 may be configured to prevent the VM instance 150A from receiving further communications from an external device after sending a termination signal to the external device, to prevent the external device from prematurely reestablishing the network connection. Thus, via the interactions of FIG. 6A, each external device with a stateful network connection to a VM instance 150A may be notified that such connection has terminated.

The interactions of FIG. 6A are continued in FIG. 6B, which depicts illustrative interactions for migrating a VM instance 150A to a worker manager 140B, and for notifying the VM instance 150A that stateful network connections to external devices have been terminated, in order to enable the instance 150A to gracefully recover those connections. The interactions of FIG. 6B illustratively occur subsequently to those of FIG. 6A, and the numbering of FIG. 6A is therefore continued in FIG. 6B. However, the interactions of these figures may in some embodiments be implemented separately.

With reference to FIG. 6B, at (4), the VM instance 150A is migrated from the worker manager 140A to the worker manager 140B. A number of mechanisms for virtual machine migration are known in the art, and therefore will not be discussed in detail herein. Any such suitable migration may be utilized in accordance with embodiments of the present disclosure. Additionally or alternatively, migration of a VM instance 150A may include transfer of a representation of the VM instance 150A, such as a snapshot, from a memory of the worker manager 140A to a memory of the worker manager 140B. In some instances, transfer of such representation may include transfer of a "delta" between a snapshot of the VM instance 150A on the worker manager 140A and a related snapshot maintained in a memory of worker manager 140B. As noted above, various snapshots in the on-demand code execution system 110 may be cascading or interrelated. Thus, where the VM instance 150A was generated based on a snapshot also maintained at the worker manager 140B (or related to a snapshot maintained at the worker manager 140B), migration of the VM instance 150A may require transfer to the worker manager 140B of only the differences between the snapshot of the VM instance 150A on the worker manager 140A and a related snapshot on the worker manager 140B. In some instances, related snapshots (e.g., representing "ancestors" states of various VM instances 150) may be distributed among worker managers 140 in the system 110 to facilitate later rapid migration of VM instances 150, if required.

In addition to information representing the VM instance 150A, the worker manager 140A transfers to the worker manager 140B, at (4), information representing stateful network connections understood by the VM instance 150A to have been maintained at the time that the instance 150A was halted. The information correspond, for example, to that retrieved from the connection state store 602 at interaction (2) of FIG. 6A, above.

Thereafter, at (5), the management unit 142 determines that the VM instance 150A should be placed into the active pool 148B on the worker manager 140B. The decision to place the VM instance 150 into the active pool 148B may be based, for example, on a predicted request to execute a task within the instance 150A.

As noted above, the VM instance 150A is assumed to have been halted at a point where it understands one or more stateful network connections to be active. However, migration of the VM instance 150A may impair such connections, for example because an external device understands a timeout to have occurred on the connection, or because a change in location of the VM instance 150A has changed a parameter of the connection (such as a source IP address). To reduce the likelihood of errors occurring due to the VM instance 150A attempting to use impaired stateful connections, the management unit 142, at (6), transmits to the VM instance 150A termination signals for each stateful network connections that the VM instance 150A understands to be active (e.g., as indicated in the connection state information received from the worker manager 140A). Transmission may include, for example, causing a host device for the VM instance 150A to generate and transmit termination signals to the VM instance 150A. A termination signal may correspond, for example, to a TCP reset packet. In one embodiment, the termination signals may be generated so as to appear to originate from the external devices to which the network connections were made. For example, the management unit 142 may modify a source IP address of each termination signal to match an IP address of the relevant external device, and may include within the termination signal a next sequence number for the connection. Thus, the VM instance 150A can be expected to process the termination signal as if it originated from the external device.

The termination signals may illustratively be transmitted during initialization of the VM instance 150A, before a task execution begins. Alternatively, termination signals may be transmitted after execution of code begins. Prior to transmission of termination signals, the management unit 142 may in some instances inhibit communication between the VM instance 150A and external devices to which the network connections were made, to prevent errors related to attempted use of such connections.

Because both the VM instance 150A and the relevant external devices have received termination signals related to stateful network connections, these endpoints can be expected to have shared, synchronized knowledge of the state of those network connections. As such, at (7), the VM instance 150A can gracefully reestablish network connections required for further processing on the VM instance 150A. Illustratively, the VM instance 150A may be configured to execute code that detects termination of stateful network connections, and attempts to reestablish those connections. As such, on reception of the termination signals from the management unit 142, the VM instance 150A can communicate with the relevant external device (e.g., auxiliary services 106) to reestablish stateful network connections.

While the interactions of FIG. 6A and 6B depict notifying both parties to a stateful network connection of termination of that connection, some embodiments of the present disclosure may notify only one such party. For example, where a VM instance 150 is the initiator of such a connection, it may be sufficient to notify only the VM instance 150 that the connection has terminated to cause the VM instance 150 to reestablish the connection. However, notification of the external device as well may in some instance mitigate problems such as an abundance of open connections at the external device, which might otherwise prohibit reestablishment of a connection to the VM instance 150 at a later time or from another location.

Figure 7:
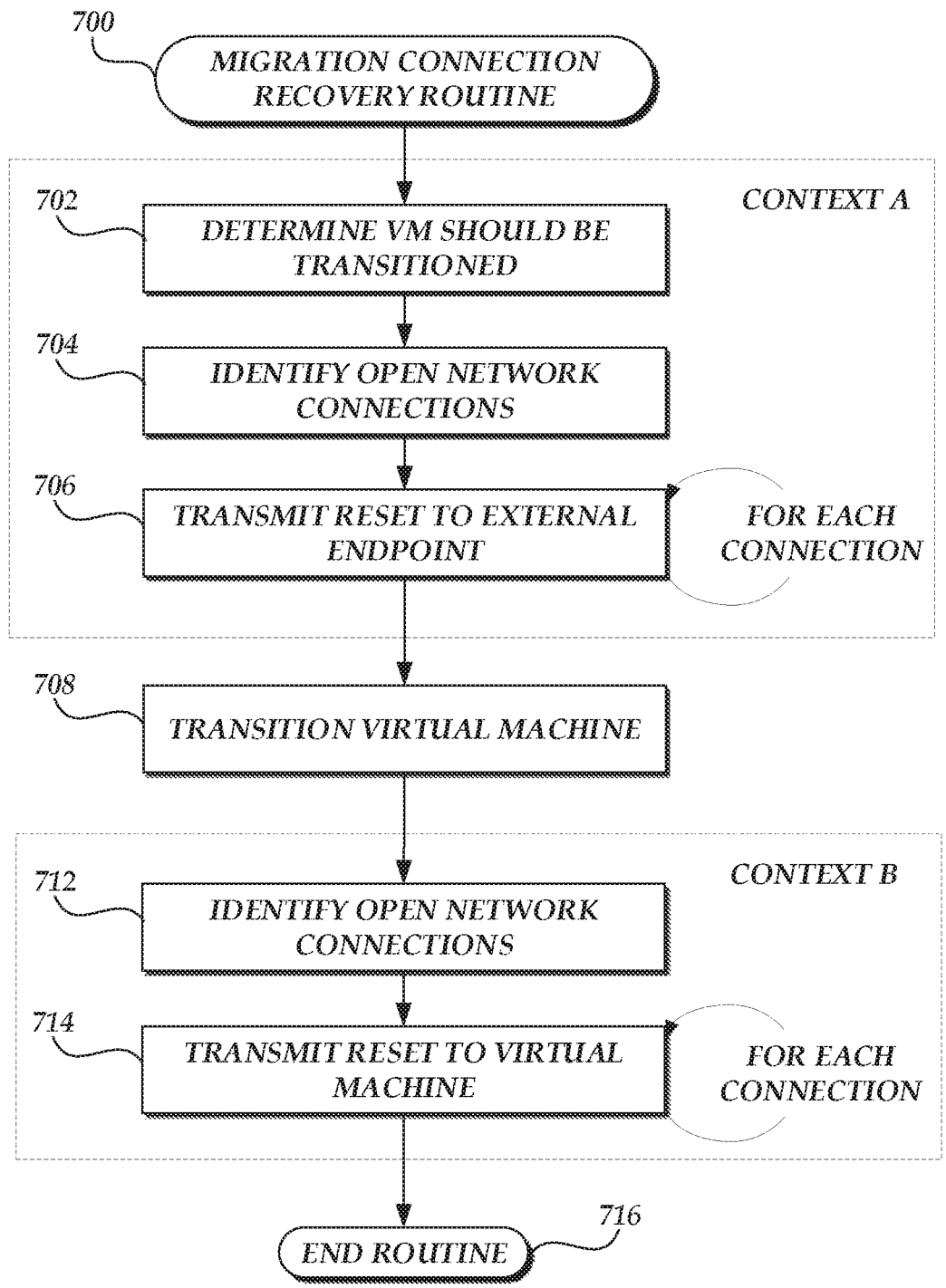
FIG. 7 is a flow chart depicting an illustrative routine for ending stateful connections of a virtual machine instance in connection with transitioning of the virtual machine instance, to facilitate graceful recovery of such network connections.

One illustrative routine 700 for ending stateful connections of a VM instance 150 in connection with transitioning of the VM instance 150 is depicted in FIG. 7. The routine 700 may be implemented in one or more contexts, identified in FIG. 7 as Context A and Context B. In one embodiment, Context A and B correspond to different host devices. Thus, routine 700 may be implemented when migrating the VM instance 150. In another embodiment, Context A and B are the same host device. Thus, routine 700 may be implemented when transitioning the VM instance 150 between memory states (e.g., when the VM instance 150 is expected or could potentially be inactive for a period of time that causes stateful network connections to be broken).

The routine 700 may be carried out, for example, by one or more management units 142 (e.g., by controlling a host device hosting a VM instance 150). Illustratively, a management unit 142 of a first host device representing Context A may implement blocks 702 through 706 of the routine 700, while a management unit 142 of a second host device representing Context B may implement blocks 710 through 714 of the routine. The management units 142 of each context may cooperate to implement block 708, which as discussed below represents transition of the VM instance 150 between contexts. Where Context A and B are the same context, one or more management units 142 of that context may implement the routine 700 in its entirety.

The routine 700 begins at block 702, where the management unit 142 determines that the VM instance 150A is to be transitioned. In some instances, the management unit 142 may determine that such a transition is to occur based on the interactions described above (e.g., based on determined that a next expected use of the instance 150 exceeds a given value). In other instances, the management unit 142 may determine that such a transition is to occur based on receiving instructions from another device or component. For example, the management unit 142 may receive instructions from an administrator or control plane device that the instance 150 should be migrated to another worker manager 140.

At block 704, the management unit 142 identifies stateful network connections maintained by the VM instance 150. The stateful network connections may be determined, for example, by interrogation of a host device hosting the VM instance 150, which may maintain information related to open network connections of the VM instance 150 in order to facilitate routing of network data packets to the VM instance 150.

At block 706, the management unit 142, for each open network connection, transmits to an external device that is party to the connection a termination signal. The termination signal may illustrative correspond to a TCP reset data packet (e.g., a TCP formatted packet with a reset bit flag set to a true value). In one embodiment, the management unit 142 "masquerades" as the VM instance 150 in order to send the termination signal, such as by altering aspects of the termination signal to match what would be expected from such a signal if generated at the VM instance 150. Illustratively, the management unit 142 may alter a source network address to match an address of the VM instance 150, or modify a sequence number to match a current sequence number for the connection (e.g., as indicated in the connection state store 602). Thus, the other parties to the stateful network connections of the VM instance 150 will understand that such connection has terminated.

At block 708, the management unit 142 transitions the VM instance 150 from Context A to Context B. In one embodiment, implementation of block 708 may include migration of the VM instance 150 from a first host device to a second host device. In another embodiment, implementation of block 708 may include transitioning the VM instance 150 from an active state to an inactive state, and back to an active state at a later point in time (e.g., to save resources associated with maintaining the VM instance 150 in an active state).

At block 712, the management unit 142 again determines open network connections that the VM instance 150 understands to be open. Where Context A and Context B are the same host device, block 712 may be duplicative and thus omitted. Where Context A and Context B are different host devices, block 712 may include a management unit 142 of a host device corresponding to Context B receiving a listing of open connections from a management unit 142 of a host device corresponding to Context A.

At block 714, the management unit 142 transmits to the VM instance 150 termination signals for each stateful network connections that the VM instance 150 understands to be open. In one embodiment, the management unit 142 may generate the termination signals so as to appear to originate from the external devices to which the network connections were made. For example, the management unit 142 may modify a source IP address of each termination signal to match an IP address of the relevant external device, and may include within the termination signal a next sequence number for the connection. Thus, the VM instance 150 can be expected to process the termination signal as if it originated from the external device.

The routine 700 then ends at block 716. As the VM instance 150 may be assumed to be executing code that operates to reestablish network connections on reception of a termination signal for those connections (as necessary), implementation of the routine 700 can thus provoke the VM instance 150 into reestablishing those connections. Moreover, because the routine 700 notifies both an external device and the VM instance 150 of termination of network connections, the parties to the connection are unlikely to attempt to utilize the connection during transition of the VM instance 150, which may be beneficial as such use may result in errors.

As will be appreciated by one skilled in the art, the routine 700 may in some embodiments be implemented by a host device hosting a VM instance 150, without requiring control of VM instance 150 or external devices to which VM instances 150 communicate. Such operation may be desirable to reduce or eliminate the need to customize code executing on VM instances 150 or external devices.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to facilitate reconnection of stateful network connections after migration of a virtual machine instance, the system comprising:
   a first host computing device and a second host computing device;
   wherein the first host computing device is configured with computer-executable instructions to:
      host the virtual machine instance prior to the migration;
      identify a stateful network connection between the virtual machine instance and an external device external to the virtual machine instance;
      independent of communications of the external device and virtual machine instance, transmit to the external device a first termination signal indicating termination of the stateful network connection, wherein the first termination signal is formatted to indicate that the first termination signal originates from the virtual machine instance; and
      migrate the virtual machine instance to the second host computing device;
   wherein the second host computing device is configured with computer-executable instructions to:
      host the virtual machine instance subsequent to the migration;
      identify the stateful network connection; and
      independent of communications of the external device and virtual machine instance, transmit to the virtual machine instance a second termination signal indicating termination of the stateful network connection, wherein the second termination signal is formatted to indicate that second termination signal originates from the external device; and
   wherein the virtual machine instance is configured, on receiving the second termination signal, to attempt to reestablish the stateful network connection.

2. The system of claim 1, wherein the stateful network connection is a network connection utilizing the transport control protocol (TCP).

3. The system of claim 1, wherein the first host computing device is configured with the computer-executable instructions to identify the stateful network connection based at least in part on state information generated at the first host computing device in response to network data transmitted from the virtual machine instance to the external device.

4. The system of claim 1, wherein the first host computing device is configured with the computer-executable instructions to format the second termination signal to indicate that it originates from the external device at least partly by including within the second termination signal a network address of the external device.

5. The system of claim 1, wherein the first host computing device is configured with the computer-executable instructions to format the first termination signal to indicate that it originates from the virtual machine instance at least partly by including within the first termination signal a next sequence number associated with the stateful network connection.

6. A computer-implemented method implemented by one or more host computing devices, the computer-implemented method comprising:
   identifying a stateful network connection between a virtual machine instance hosted by the one or more host computing devices and an external device external to the virtual machine instance;
   independent of communications of the external device and virtual machine instance, transmitting to the external device a first termination signal indicating termination of the stateful network connection;
   temporarily halting execution of the virtual machine instance; and
   in response to resuming execution of the virtual machine instance on a host computing device, and independent of communications of the external device and virtual machine instance, transmitting, to the virtual machine instance executing on the host computing device, a second termination signal indicating termination of the stateful network connection;
   wherein the virtual machine instance is configured, on receiving the second termination signal, to attempt to reestablish the stateful network connection.

7. The computer-implemented method of claim 6, wherein the one or more host computing devices comprise a single host computing device, and wherein temporarily halting execution of the virtual machine instance comprises transitioning of the virtual machine instance to secondary memory of the single host computing device.

8. The computer-implemented method of claim 6, wherein the one or more host computing devices comprise a first host computing device and second host computing device, and wherein temporarily halting execution of the virtual machine instance comprises migrating the virtual machine instance from the first host computing device to the second host computing device.

9. The computer-implemented method of claim 8, wherein migrating the virtual machine instance from the first host computing device to the second host computing device comprises generating a snapshot of the virtual machine instance at the first host computing device and transmitting the snapshot to the second host computing device.

10. The computer-implemented method of claim 9, the snapshot of the virtual machine instance represents a difference in state of the virtual machine instance from a prior snapshot of the virtual machine instance maintained at the second host computing device.

11. The computer-implemented method of claim 6, wherein the first termination signal is formatted to indicate that the first termination signal originates from the virtual machine instance.

12. The computer-implemented method of claim 6, wherein the first termination signal is formatted to indicate that the first termination signal originates from the virtual machine instance at least partly by inclusion in the first termination signal of a next sequence number for the stateful network connection.

13. The computer-implemented method of claim 12, transmitting to the external device the first termination signal indicating termination of the stateful network connection occurs subsequent to resuming execution of the virtual machine instance.

14. The computer-implemented method of claim 12, wherein identifying the stateful network connection comprises identifying a plurality of stateful network connections, and wherein transmitting to the virtual machine instance the second termination signal indicating termination of the stateful network connection comprises transmitting to the virtual machine instance a plurality of second termination signals, each of the second termination signals indicating termination of a stateful network connection of the plurality of stateful network connections.

15. Non-transitory computer-readable media comprising instructions executable by a computing system to:
  identify a stateful network connection between a virtual machine instance hosted by the computing system and an external device external to the virtual machine instance;
  temporarily halt execution of the virtual machine instance; and
  in response to resuming execution of the virtual machine instance on a host computing device, and independent of communications of the external device and virtual machine instance, transmit, to the virtual machine instance executing on the host computing device, a termination signal indicating termination of the stateful network connection;
  wherein the virtual machine instance is configured, on receiving the termination signal, to attempt to reestablish the stateful network connection.

16. The non-transitory computer-readable media of claim 15, wherein the termination signal is formatted to indicate that the termination signal originates from the external device.

17. The non-transitory computer-readable media of claim 15, wherein the termination signal is formatted to indicate that the termination signal originates from the external device at least partly by including within the termination signal a next sequence number associated with the stateful network connection.

18. The non-transitory computer-readable media of claim 15 further comprising instructions executable by the computing system to transmit to the external device a second termination signal indicating termination of the stateful network connection, wherein the second termination signal is transmitted independent of communications of the external device and virtual machine instance.

19. The non-transitory computer-readable media of claim 18, wherein the second termination signal is formatted to indicate that the second termination signal originates from the virtual machine instance.

20. The non-transitory computer-readable media of claim 15, wherein the stateful network connection comprises a plurality of stateful network connections, and wherein the instructions are executable by the computing system to transmit to the virtual machine instance a plurality of second termination signals, each of the second termination signals indicating termination of a stateful network connection of the plurality of stateful network connections.

\* \* \* \* \*